(12) United States Patent
de Paz

(10) Patent No.: US 10,558,415 B2
(45) Date of Patent: Feb. 11, 2020

(54) GRAVITY DROP

(71) Applicant: Z124, George Town (KY)

(72) Inventor: Alexander de Paz, Burlington (CA)

(73) Assignee: Z124, Georgetown (KY)

( * ) Notice: Subject to any disclaimer, the term of this patent is extended or adjusted under 35 U.S.C. 154(b) by 223 days.

(21) Appl. No.: 15/237,479

(22) Filed: Aug. 15, 2016

(65) Prior Publication Data

US 2017/0039019 A1 Feb. 9, 2017

Related U.S. Application Data

(63) Continuation of application No. 13/540,066, filed on Jul. 2, 2012, now abandoned, which is a continuation-in-part of application No. 13/222,902, filed on Aug. 31, 2011, now Pat. No. 9,001,158.

(60) Provisional application No. 61/539,884, filed on Sep. 27, 2011, provisional application No. 61/389,000, filed on Oct. 1, 2010, provisional application No. 61/389,087, filed on Oct. 1, 2010, provisional application No. 61/389,117, filed on Oct. 1, 2010.

(51) Int. Cl.
*G06F 3/14* (2006.01)
*G06F 3/01* (2006.01)

(52) U.S. Cl.
CPC ............ *G06F 3/1423* (2013.01); *G06F 3/017* (2013.01)

(58) Field of Classification Search
CPC .. G06Q 10/06393; G06Q 10/10; H04L 51/32; H04L 67/306; G06F 3/0481; G06F 3/04842; H05K 5/0226; H05K 5/0017

USPC .......................................................... 345/659
See application file for complete search history.

(56) References Cited

U.S. PATENT DOCUMENTS

| | | | |
|---|---|---|---|
| 5,995,103 A | * | 11/1999 | Ashe ........................ G09G 5/14 715/804 |
| 6,512,497 B1 | | 1/2003 | Kondo et al. |
| 7,864,517 B2 | | 1/2011 | Miller et al. |
| 7,864,524 B2 | | 1/2011 | Ladouceur et al. |
| 8,194,001 B2 | | 6/2012 | Miller et al. |
| 8,289,688 B2 | | 10/2012 | Behar et al. |
| 8,446,377 B2 | | 5/2013 | Estrada et al. |
| 8,539,384 B2 | | 9/2013 | Hinckley et al. |
| 8,698,751 B2 | | 4/2014 | Sirpal et al. |
| 8,917,221 B2 | | 12/2014 | de Paz |
| 9,001,158 B2 | | 4/2015 | de Paz |

(Continued)

OTHER PUBLICATIONS

Burns, C., "Motorola ATRIX 4G Laptop Dock Review," at www.androidcommunity.com/motorola-atrix-4g-laptop-dock-review-20110220/, Feb. 20, 2011, 5 pages.

(Continued)

*Primary Examiner* — Michelle Chin
(74) *Attorney, Agent, or Firm* — Sheridan Ross P.C.

(57) ABSTRACT

A multi-screen user device and methods for controlling data displayed thereby are disclosed. Specifically, the data displayed by the multiple screens of the multi-screen user device is conditioned upon the relative position of the multiple screens. A gravity drop display feature is also disclosed in which data from a first application on a first screen is automatically displayed on a second screen when the device is rotated. Modal windows can be displayed with the gravity drop display feature in which the modal windows can either be dismissed upon execution of the gravity drop feature, or can remain being displayed.

19 Claims, 23 Drawing Sheets

(56) References Cited

U.S. PATENT DOCUMENTS

| | | |
|---|---|---|
| 2004/0049743 A1 | 3/2004 | Bogward |
| 2005/0093868 A1 | 5/2005 | Hinckley |
| 2006/0187142 A1 | 8/2006 | Lesniak |
| 2007/0046561 A1 | 3/2007 | Cheon et al. |
| 2007/0085759 A1 | 4/2007 | Lee et al. |
| 2007/0120762 A1 | 5/2007 | O'Gorman |
| 2008/0062625 A1 | 3/2008 | Batio |
| 2009/0079701 A1 | 3/2009 | Grosskopf, Jr. |
| 2009/0244016 A1 | 10/2009 | Casparian et al. |
| 2009/0278806 A1 | 11/2009 | Duarte et al. |
| 2009/0298550 A1* | 12/2009 | Kang .................. G06F 3/147 455/566 |
| 2009/0303208 A1 | 12/2009 | Case, Jr. et al. |
| 2009/0322690 A1 | 12/2009 | Hiltunen et al. |
| 2010/0007603 A1* | 1/2010 | Kirkup .................. G06F 1/1616 345/158 |
| 2010/0053852 A1 | 3/2010 | Tseng et al. |
| 2010/0064244 A1 | 3/2010 | Kilpatrick, II et al. |
| 2010/0085255 A1 | 4/2010 | Wakabayashi |
| 2010/0085274 A1 | 4/2010 | Kilpatrick, II et al. |
| 2010/0085382 A1 | 4/2010 | Lundqvist et al. |
| 2010/0156913 A1 | 6/2010 | Ortega et al. |
| 2010/0162128 A1 | 6/2010 | Richardson et al. |
| 2010/0177047 A1 | 7/2010 | Brenneman et al. |
| 2010/0321275 A1 | 12/2010 | Hinckley et al. |
| 2011/0216064 A1 | 9/2011 | Dahl et al. |
| 2012/0084699 A1 | 4/2012 | Sirpal et al. |
| 2012/0084701 A1 | 4/2012 | Sirpal et al. |
| 2013/0050265 A1 | 2/2013 | de Paz |

OTHER PUBLICATIONS

Catacchio, Chad, "This smartphone has two huge screens . . . that rotate," The Next Web at www.thenextweb.com/asia/2010/10/07/this-smartphone-has-two-huge-screens-that-rotate/, Jul. 21, 2011, 2 pages.

Google images, accessed Apr. 18, 2011, 6 pages.

Harman03, "Kyocera Echo Dual-screen Android Phone," posted 4 weeks from Apr. 18, 2011, 3 pages.

"Lapdock™ for Motorola ATRIX," at www.motorola.com/Consumers/US-EN/Consumer-Product-and-Services/Mobile . . . , accessed Apr. 18, 2011, 1 page.

"Motorola ATRIX 4G Laptop Dock Review," at www.phonearena.com/reviews/Motorola-ATRIX-4G-Laptop-Dock-Review_id2667, Mar. 2, 2011, 6 pages.

Stein, S., "How does the Motorola Atrix 4G Lapdock compare with a laptop?" Crave—CNET, at www.news.cnet.com/8301-17938_105-20031251-1.html, Feb. 9, 2011, 7 pages.

Website entitled, "Kyocera Echo," at www.echobykyocera.com/, 2011, 6 pages.

Website entitled, "Sony Tablet," at www.store.sony.com/webapp/wcs/stores/servlet/CategoryDisplay?catalogId=10551&storeId=10151&langId=-1&categoryId=8198552921644795521, 2011, 3 pages.

International Search Report and Written Opinion for International Patent Application No. PCT/US11/53844, dated Feb. 27, 2012, 7 pages.

International Preliminary Report on Patentability for International Patent Application No. PCT/US11/53844, dated Mar. 6, 2014, 6 pages.

International Search Report and Written Opinion for International Patent Application No. PCT/US11/53839, dated Feb. 28, 2012, 9 pages.

International Preliminary Report on Patentability for International Patent Application No. PCT/US11/53839, dated Feb. 20, 2014, 8 pages.

Official Action for U.S. Appl. No. 13/222,910 dated Sep. 19, 2013, 14 pages.

Official Action for U.S. Appl. No. 13/222,910 dated Oct. 15, 2013, 17 pages.

Official Action for U.S. Appl. No. 13/222,910 dated Apr. 18, 2014, 14 pages.

Official Action for U.S. Appl. No. 13/222,910 dated Jun. 25, 2014, 17 pages.

Notice of Allowance for U.S. Appl. No. 13/222,910 dated Aug. 7, 2014, 10 pages.

Official Action for U.S. Appl. No. 13/222,902 dated Nov. 6, 2013, 8 pages.

Official Action for U.S. Appl. No. 13/222,902 dated Mar. 12, 2014, 15 pages.

Official Action for U.S. Appl. No. 13/222,902 dated Aug. 25, 2014, 13 pages.

Notice of Allowance for U.S. Appl. No. 13/222,902 dated Dec. 2, 2014, 10 pages.

Notice of Allowance for U.S. Appl. No. 13/247,827 dated Sep. 30, 2013, 15 pages.

Supplemental Notice of Allowability for U.S. Appl. No. 13/247,827 dated Oct. 30, 2013, 10 pages.

Notice of Allowance for U.S. Appl. No. 13/247,827 dated Dec. 17, 2013, 10 pages.

Official Action for U.S. Appl. No. 13/540,066 dated Jul. 18, 2014, 20 pages.

Official Action for U.S. Appl. No. 13/540,066 dated Feb. 3, 2015, 30 pages.

Official Action for U.S. Appl. No. 13/540,066, dated Aug. 13, 2015 38 pages.

Official Action for U.S. Appl. No. 13/540,066, dated Mar. 15, 2016 43 pages.

* cited by examiner

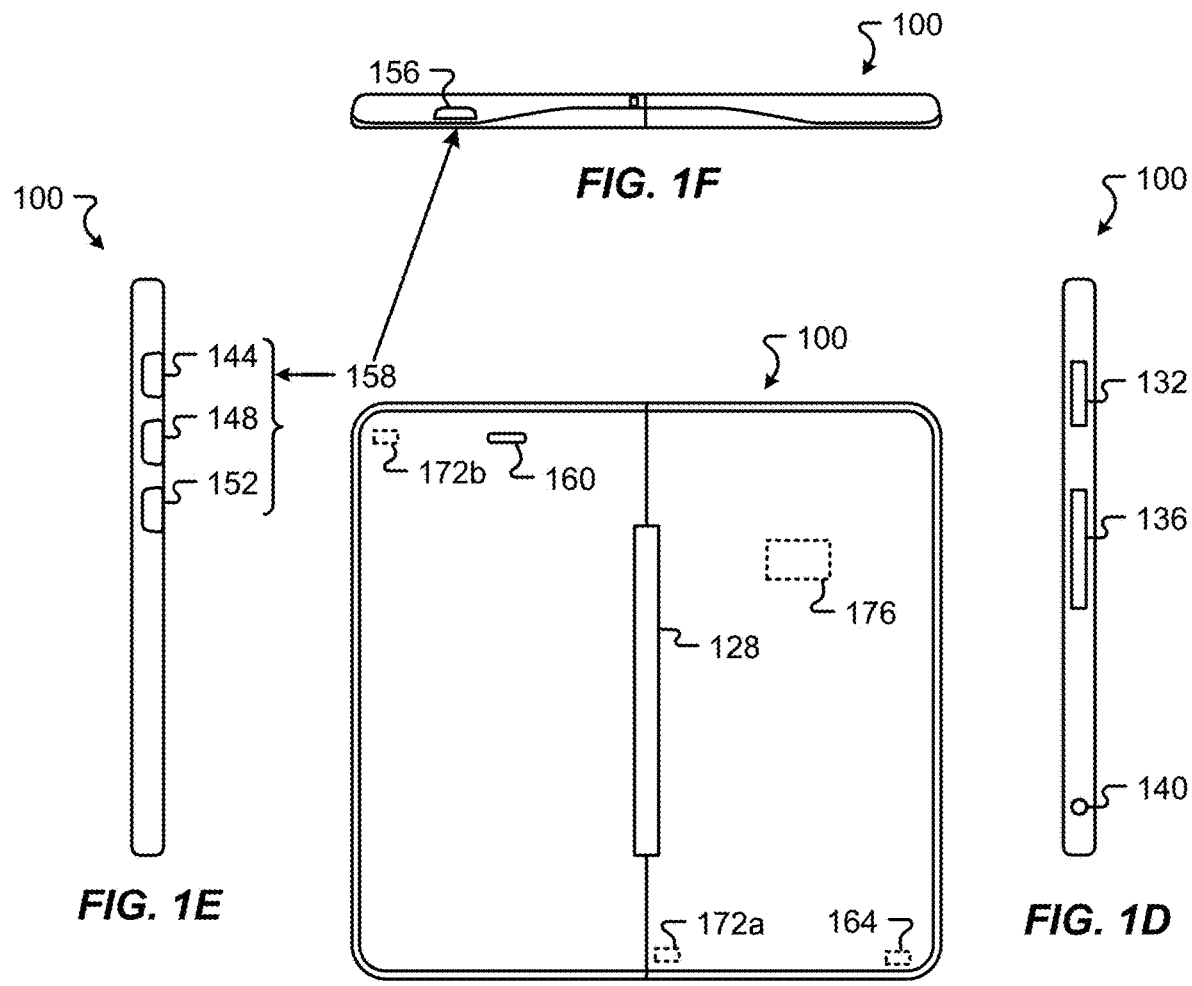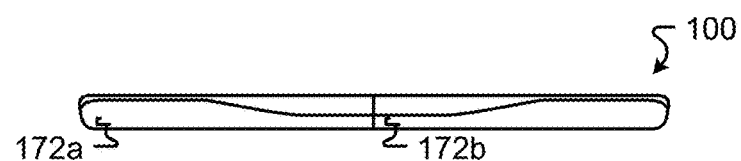

|  |  | PORTRAIT | | | | | LANDSCAPE | | | | | |
|---|---|---|---|---|---|---|---|---|---|---|---|---|
|  |  | OPEN | CLOSED | EASEL | MODIFIED EASEL | PHONE | IMAGE/VIDEO | OPEN | CLOSED | EASEL | MODIFIED EASEL | PHONE | IMAGE/VIDEO |
| P O R T R A I T | OPEN | X | HT | HT | HT | P | I | AT | HAT | HAT | HAT | P | I |
|  | CLOSED | HT | X | HAT | HAT | P | I | HAT | AT | HAT | HAT | P | I |
|  | EASEL | HT | HT | X | X | P | I | HAT | HAT | HAT | HAT | P | I |
|  | PHONE | HT | X | HT | HT | X | I | HAT | HAT | HAT | HAT | X | I |
|  | IMAGE/VIDEO | HT | HT | HT | X | P | X | HAT | HAT | HAT | HAT | P | HAT |
| L A N D S C A P E | OPEN | AT | HAT | HAT | HAT | P | I | X | HT | HAT | HAT | P | I |
|  | CLOSED | HAT | AT | HAT | HAT | P | I | HT | X | HAT | HAT | P | I |
|  | EASEL | HAT | HAT | HAT | HAT | P | I | HT | HT | HAT | HAT | P | I |
|  | MODIFIED EASEL | HAT | HAT | HAT | HAT | HAT | AT | HT | HT | X | X | X | X |
|  | IMAGE/VIDEO | HAT | HAT | HAT | HAT | P | I | HT | HT | HT | HAT | P | X |
|  | DOCKED |  |  |  |  |  |  |  |  |  |  |  |  |

DOCKING SIGNAL

Key:
H - Hall Effect Sensor(s)
a - accelerometer(s)
T - Timer
P – communications Trigger
I – Image / Video capture Request

FIG. 3B

Tap

Long Press

Drag

Flick

Pinch

Spread

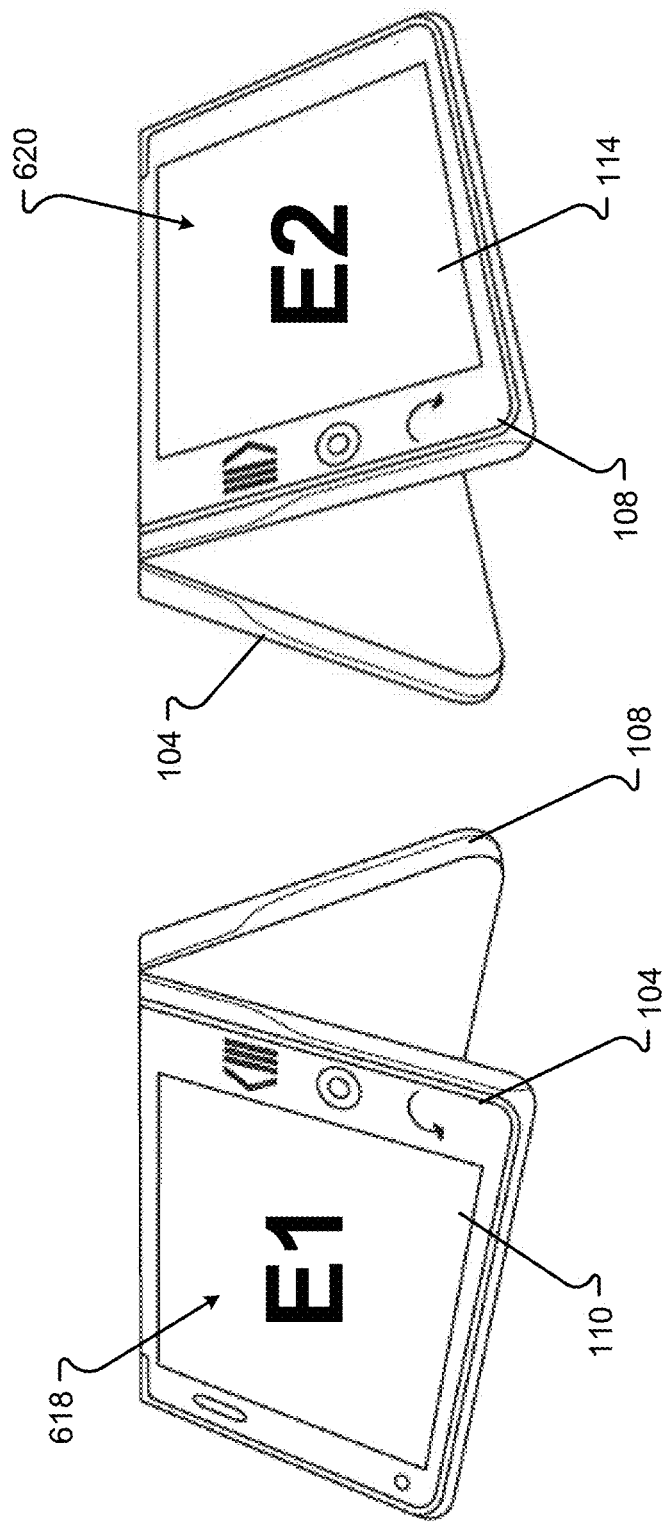

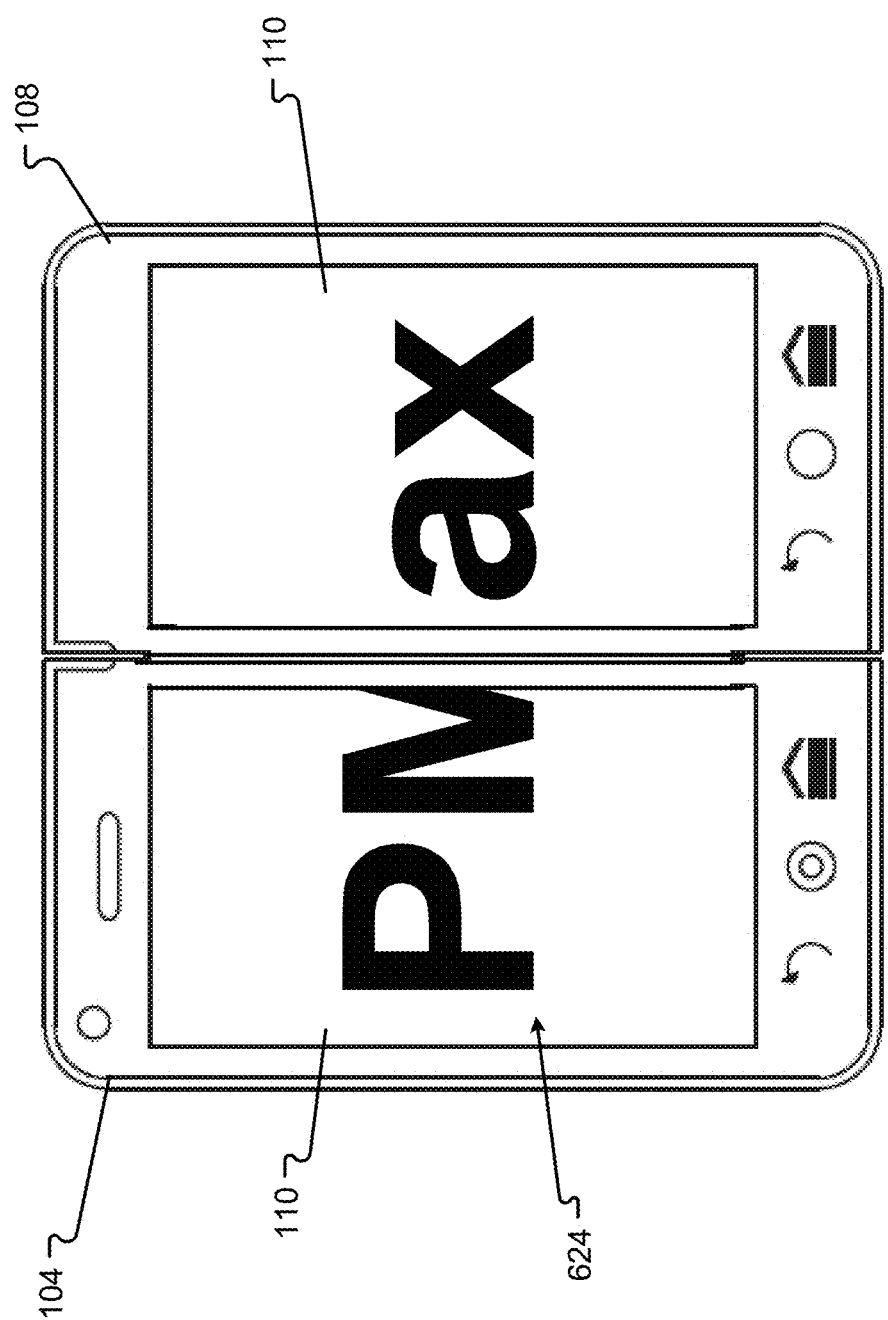

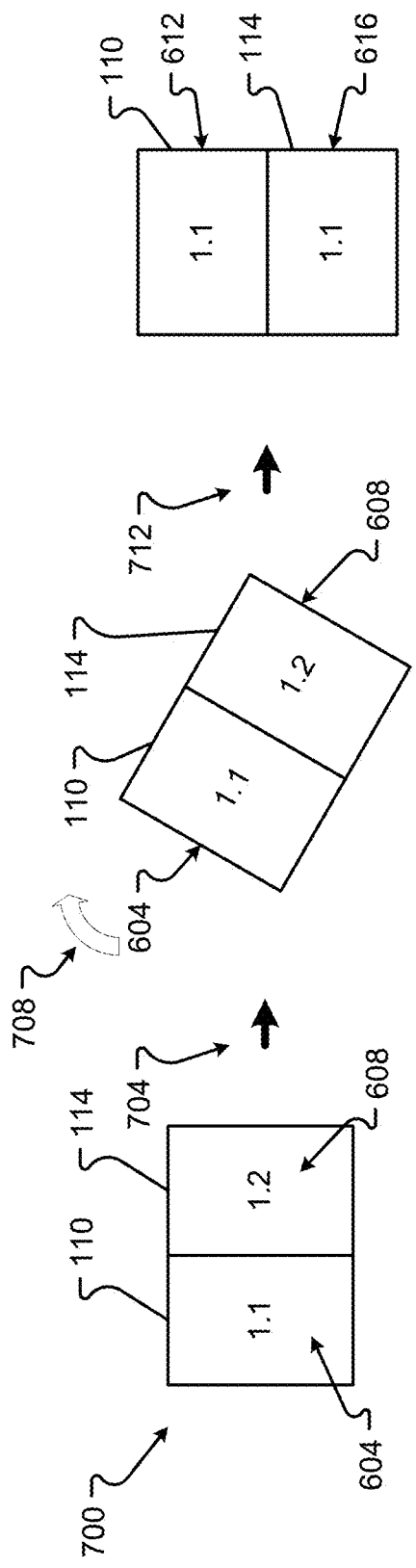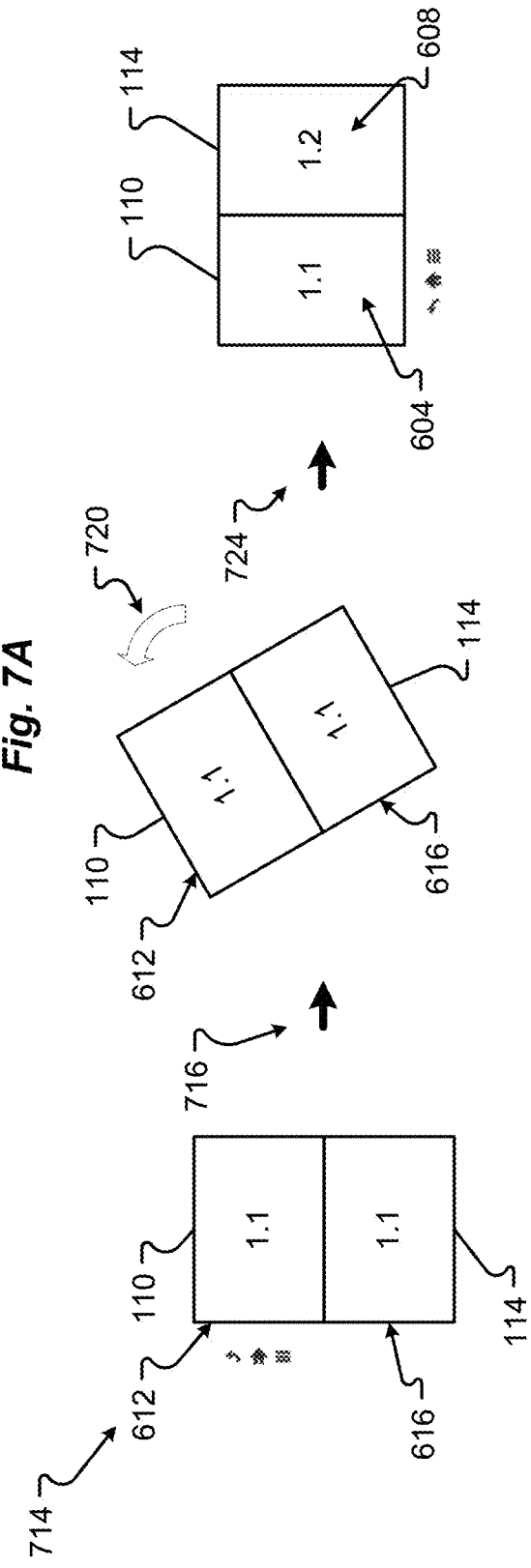
*Fig. 7A*
*Fig. 7B*

GRAVITY DROP

CROSS REFERENCE TO RELATED APPLICATION

The present application is a continuation of and claims priority to U.S. patent application Ser. No. 13/540,066, filed Jul. 2, 2012, of the same title, which claims the benefits of and priority, under 35 U.S.C. § 119(e), to U.S. Provisional Application Ser. No. 61/539,884, filed Sep. 27, 2011, entitled "MOBILE DEVICE," and U.S. patent application Ser. No. 13/540,066 is also a continuation-in-part application of U.S. patent application Ser. No. 13/222,902, filed Aug. 31, 2011, entitled "ROTATION GRAVITY DROP," which claims the benefits of and priority, under 35 U.S.C. § 119(e), to U.S. Provisional Application Ser. No. 61/389,000, filed Oct. 1, 2010, entitled "DUAL DISPLAY WINDOWING SYSTEM"; 61/389,117, filed Oct. 1, 2010, entitled "MULTI-OPERATING SYSTEM PORTABLE DOCKING DEVICE"; and 61/389,087, filed Oct. 1, 2010, entitled "SYSTEMS AND METHODS RELATING TO USER INTERFACES FOR DOCKING PORTABLE ELECTRONIC DEVICES"; each of which are incorporated herein by reference in their entirety for all that they teach and for all purposes.

BACKGROUND

A substantial number of handheld computing devices, such as cellular phones, tablets, and E-Readers, make use of a touch screen display not only to deliver display information to the user but also to receive inputs from user interface commands. While touch screen displays may increase the configurability of the handheld device and provide a wide variety of user interface options, this flexibility typically comes at a price. The dual use of the touch screen to provide content and receive user commands, while flexible for the user, may obfuscate the display and cause visual clutter, thereby leading to user frustration and loss of productivity.

The small form factor of handheld computing devices requires a careful balancing between the displayed graphics and the area provided for receiving inputs. On the one hand, the small display constrains the display space, which may increase the difficulty of interpreting actions or results. On the other hand, a virtual keypad or other user interface scheme is superimposed on or positioned adjacent to an executing application, requiring the application to be squeezed into an even smaller portion of the display.

This balancing act is particularly difficult for single display touch screen devices. Single display touch screen devices are crippled by their limited screen space. When users are entering information into the device, through the single display, the ability to interpret information in the display can be severely hampered, particularly when a complex interaction between display and interface is required.

SUMMARY

There is a need for a multi-display handheld computing device that provides for enhanced power and/or versatility compared to conventional single display handheld computing devices. These and other needs are addressed by the various aspects, embodiments, and/or configurations of the present disclosure. Also, while the disclosure is presented in terms of exemplary embodiments, it should be appreciated that individual aspects of the disclosure can be separately claimed.

In one aspect of the invention, it includes a method of controlling data displayed by a multi-screen device, comprising: (i) providing the multi-screen device including a first screen and a second screen; (ii) providing a first display for the first screen, and a second display for the second screen, the first and second displays being portions of a single application or being separate applications; (iii) detecting the device in a first orientation, wherein the device is in an open state and the first display is located horizontally adjacent to the second display; (iv) rotating the device from the first orientation to a second orientation, wherein the device remains in an open state and the first display is placed above the second display; (v) detecting the device in the second orientation; and (vi) executing a gravity drop function, wherein data from the first display also occupies the second display, the second display is dismissed, and the first display therefore being maximized across both screens.

In another aspect of the invention, it includes a method of controlling data displayed by a multi-screen device, comprising: (i) providing the multi-screen device including a first screen and a second screen; (ii) providing a first display for the first screen and a second display for the second screen, the first and second displays being portions of a single application or being separate applications, at least one of the first or second applications further including a modal window; (iii) detecting the device in a first orientation, wherein the device is in an open state and the first display is located horizontally adjacent to the second display; (iv) rotating the device from the first orientation to a second orientation, wherein the device remains in an open state and the first display is placed above the second display; (v) detecting the device in the second orientation; and (vi) executing a gravity drop function, wherein data from the first display also occupies the second display, the second display and the modal window are dismissed, and the first display therefore being maximized across both screens.

In another aspect of the invention, it includes a method of controlling data displayed by a multi-screen device, comprising: (i) providing the multi-screen device including a first screen and a second screen; (ii) providing a first display for the first screen and a second display for the second screen, the first and second displays being portions of a single application or being separate applications, at least one of the first or second applications further including a modal window; (iii) detecting the device in a first orientation, wherein the device is in an open state and the first display is located horizontally adjacent to the second display; (iv) rotating the device from the first orientation to a second orientation, wherein the device remains in an open state and the first display is placed above the second display;

detecting the device in the second orientation; and (v) executing a gravity drop function, wherein data from the first display also occupies the second display, the second display being dismissed, the first display therefore being maximized across both screens, and the modal window continue being displayed.

In another aspect of the invention, it includes a non-transient computer readable medium comprising microprocessor executable instructions operable to perform at least the following steps for a multi screen device having a first display for a first screen and a second display for a second screen, the first and second displays being portions of a single application or being separate applications: (i) detecting the device in a first orientation, wherein the device is in an open state and the first display is located horizontally adjacent to the second display; (ii) detecting rotating the device from the first orientation to a second orientation, wherein the device remains in an open state and the first display is placed above the second display;

detecting the device in the second orientation; and (iii) executing a gravity drop function, wherein data from the first display also occupies the second display, the second display is dismissed, and the first display therefore being maximized across both screens.

In another aspect of the invention, it includes a non-transient computer readable medium comprising microprocessor executable instructions operable to perform at least the following steps for a multi screen device having a first display for a first screen and a second display for a second screen, the first and second displays being portions of a single application or being separate applications, at least one of the first or second applications further including a modal window: (i) detecting the device in a first orientation, wherein the device is in an open state and the first display is located horizontally adjacent to the second display; (ii) detecting rotating the device from the first orientation to a second orientation, wherein the device remains in an open state and the first display is placed above the second display; (iii) detecting the device in the second orientation; and (iv) executing a gravity drop function, wherein data from the first display also occupies the second display, the second display is dismissed, the first display therefore being maximized across both screens, and the modal window continue being displayed.

In yet another aspect of the invention, it includes a non-transient computer readable medium comprising microprocessor executable instructions operable to perform at least the following steps for a multi screen device having a first display for a first screen and a second display for a second screen, the first and second displays being portions of a single application or being separate applications, at least one of the first or second applications further including a modal window: (i) detecting the device in a first orientation, wherein the device is in an open state and the first display is located horizontally adjacent to the second display; (ii) detecting rotating the device from the first orientation to a second orientation, wherein the device remains in an open state and the first display is placed above the second display; (iii)

detecting the device in the second orientation; and (iv) executing a gravity drop function, wherein data from the first display also occupies the second display, the second display is dismissed, the first display therefore being maximized across both screens, and the modal window being dismissed.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "desktop" refers to a metaphor used to portray systems. A desktop is generally considered a "surface" that typically includes pictures, called icons, widgets, folders, etc. that can activate show applications, windows, cabinets, files, folders, documents, and other graphical items. The icons are generally selectable to initiate a task through user interface interaction to allow a user to execute applications or conduct other operations.

The term "display" refers to a portion of a screen used to display the output of a computer to a user.

The term "displayed image" refers to an image produced on the display. A typical displayed image is a window or desktop. The displayed image may occupy all or a portion of the display.

The term "display orientation" refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical. The multi-screen display can have one composite display that encompasses all the screens. The composite display can have different display characteristics based on the various orientations of the device.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "module" as used herein refers to any known or later developed hardware, software, firmware, artificial intelligence, fuzzy logic, or combination of hardware and software that is capable of performing the functionality associated with that element.

The term "gesture capture" refers to a sense or otherwise a detection of an instance and/or type of user gesture. The gesture capture can occur in one or more areas of the screen, A gesture region can be on the display, where it may be referred to as a touch sensitive display or off the display where it may be referred to as a gesture capture area.

A "multi-screen application" refers to an application that is capable of producing one or more windows that may simultaneously occupy multiple screens. A multi-screen application commonly can operate in single-screen mode in which one or more windows of the application are displayed only on one screen or in multi-screen mode in which one or more windows are displayed simultaneously on multiple screens.

A "single-screen application" refers to an application that is capable of producing one or more windows that may occupy only a single screen at a time.

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "window" refers to a, typically rectangular, displayed image on at least part of a display that contains or provides content different from the rest of the screen. The window may obscure the desktop.

The terms "determine", "calculate" and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 1C includes a third view of an embodiment of a multi-screen user device;

FIG. 1D includes a fourth view of an embodiment of a multi-screen user device;

FIG. 1E includes a fifth view of an embodiment of a multi-screen user device;

FIG. 1F includes a sixth view of an embodiment of a multi-screen user device;

FIG. 1G includes a seventh view of an embodiment of a multi-screen user device;

FIG. 3B is a table of an embodiment of the state model for the device based on the device's orientation and/or configuration;

FIG. 6G is a seventh representation of an embodiment of a device configuration generated in response to the device state;

FIG. 6H is a eighth representation of an embodiment of a device configuration generated in response to the device state;

FIG. 6I is a ninth representation of an embodiment of a device configuration generated in response to the device state;

FIG. 7A depicts a first sequence of gestures to invoke a first display action in accordance with embodiments of the present disclosure;

FIG. 7B depicts a second sequence of gestures to invoke a second display action in accordance with embodiments of the present disclosure;

Figure 1A:
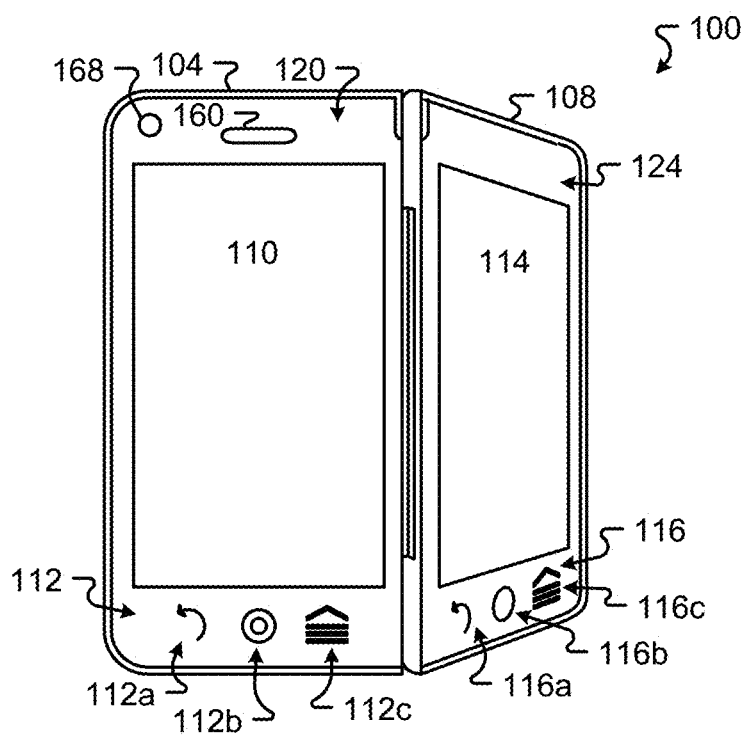
FIG. 1A includes a first view of an embodiment of a multi-screen user device.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a communications device, such as a cellular telephone, or other smart device. The device can include two screens that are oriented to provide several unique display configurations. Further, the device can receive user input in unique ways. The overall design and functionality of the device provides for an enhanced user experience making the device more useful and more efficient.

Mechanical Features:

FIGS. 1A-1J illustrate a device 100 in accordance with embodiments of the present disclosure. As described in greater detail below, device 100 can be positioned in a number of different ways each of which provides different functionality to a user. The device 100 is a multi-screen device that includes a primary screen 104 and a secondary screen 108, both of which are touch sensitive. In embodiments, the entire front surface of screens 104 and 108 may be touch sensitive and capable of receiving input by a user touching the front surface of the screens 104 and 108. Primary screen 104 includes touch sensitive display 110, which, in addition to being touch sensitive, also displays information to a user. Secondary screen 108 includes touch sensitive display 114, which also displays information to a user. In other embodiments, screens 104 and 108 may include more than one display area.

Primary screen 104 also includes a configurable area 112 that has been configured for specific inputs when the user touches portions of the configurable area 112. Secondary screen 108 also includes a configurable area 116 that has been configured for specific inputs. Areas 112a and 116a have been configured to receive a "back" input indicating that a user would like to view information previously displayed. Areas 112b and 116b have been configured to receive a "menu" input indicating that the user would like to view options from a menu. Areas 112c and 116c have been configured to receive a "home" input indicating that the user would like to view information associated with a "home" view. In other embodiments, areas 112a-c and 116a-c may be configured, in addition to the configurations described above, for other types of specific inputs including controlling features of device 100, some non-limiting examples including adjusting overall system power, adjusting the volume, adjusting the brightness, adjusting the vibration, selecting of displayed items (on either of screen 104 or 108), operating a camera, operating a microphone, and initiating/terminating of telephone calls. Also, in some embodiments, areas 112a-c and 116a-c may be configured for specific inputs depending upon the application running on device 100 and/or information displayed on touch sensitive displays 110 and/or 114.

In addition to touch sensing, primary screen 104 and secondary screen 108 may also include areas that receive input from a user without requiring the user to touch the display area of the screen. For example, primary screen 104 includes gesture capture area 120, and secondary screen 108 includes gesture capture area 124. These areas are able to receive input by recognizing gestures made by a user without the need for the user to actually touch the surface of the display area. In comparison to touch sensitive displays 110 and 114, the gesture capture areas 120 and 124 are commonly not capable of rendering a displayed image.

Figure 1B:
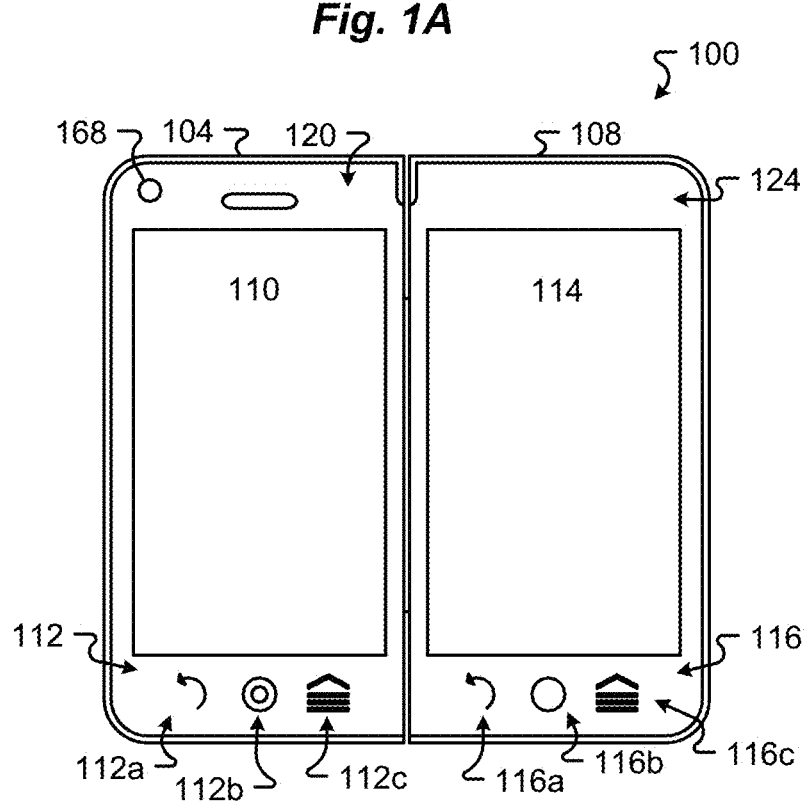
FIG. 1B includes a second view of an embodiment of a multi-screen user device.

The two screens 104 and 108 are connected together with a hinge 128, shown clearly in FIG. 1C (illustrating a back view of device 100). Hinge 128, in the embodiment shown in FIGS. 1A-1J, is a center hinge that connects screens 104 and 108 so that when the hinge is closed, screens 104 and 108 are juxtaposed (i.e., side-by-side) as shown in FIG. 1B (illustrating a front view of device 100). Hinge 128 can be opened to position the two screens 104 and 108 in different relative positions to each other. As described in greater detail below, the device 100 may have different functionalities depending on the relative positions of screens 104 and 108.

FIG. 1D illustrates the right side of device 100. As shown in FIG. 1D, secondary screen 108 also includes a card slot 132 and a port 136 on its side. Card slot 132 in embodiments, accommodates different types of cards including a subscriber identity module (SIM). Port 136 in embodiments is an input/output port (I/O port) that allows device 100 to be connected to other peripheral devices, such as a display, keyboard, or printing device. As can be appreciated, these are merely some examples and in other embodiments device 100 may include other slots and ports such as slots and ports for accommodating additional memory devices and/or for connecting other peripheral devices. Also shown in FIG. 1D is an audio jack 140 that accommodates a tip, ring, sleeve (TRS) connector for example to allow a user to utilize headphones or a headset.

Device 100 also includes a number of buttons 158. For example, FIG. 1E illustrates the left side of device 100. As shown in FIG. 1E, the side of primary screen 104 includes three buttons 144, 148, and 152, which can be configured for specific inputs. For example, buttons 144, 148, and 152 may be configured to, in combination or alone, control a number of aspects of device 100. Some non-limiting examples include overall system power, volume, brightness, vibration, selection of displayed items (on either of screen 104 or 108), a camera, a microphone, and initiation/termination of telephone calls. In some embodiments, instead of separate buttons two buttons may be combined into a rocker button. This arrangement is useful in situations where the buttons are configured to control features such as volume or brightness. In addition to buttons 144, 148, and 152, device 100 also includes a button 156, shown in FIG. 1F, which illustrates the top of device 100. In one embodiment, button 156 is configured as an on/off button used to control overall system power to device 100. In other embodiments, button 156 is configured to, in addition to or in lieu of controlling system power, control other aspects of device 100. In some embodiments, one or more of the buttons 144, 148, 152, and 156 are capable of supporting different user commands. By way of example, a normal press has a duration commonly of less than about 1 second and resembles a quick tap. A medium press has a duration commonly of 1 second or more but less than about 12 seconds. A long press has a duration commonly of about 12 seconds or more. The function of the buttons is normally specific to the application that is currently in focus on the respective display 110 and 114. In a telephone application for instance and depending on the particular button, a normal, medium, or long press can mean end call, increase in call volume, decrease in call volume, and toggle microphone mute. In a camera or video application for instance and depending on the particular button, a normal, medium, or long press can mean increase zoom, decrease zoom, and take photograph or record video.

There are also a number of hardware components within device 100. As illustrated in FIG. 1C, device 100 includes a speaker 160 and a microphone 164. Device 100 also includes a camera 168 (FIG. 1B). Additionally, device 100 includes two position sensors 172A and 172B, which are used to determine the relative positions of screens 104 and 108. In one embodiment, position sensors 172A and 172B are Hall effect sensors. However, in other embodiments other sensors can be used in addition to or in lieu of the Hall effect sensors. An accelerometer 176 may also be included as part of device 100 to determine the orientation of the device 100 and/or the orientation of screens 104 and 108. Additional internal hardware components that may be included in device 100 are described below with respect to FIG. 2.

The overall design of device 100 allows it to provide additional functionality not available in other communication devices. Some of the functionality is based on the various positions and orientations that device 100 can have. As shown in FIGS. 1B-1G, device 100 can be operated in an "open" position where screens 104 and 108 are juxtaposed. This position allows a large display area for displaying information to a user. When position sensors 172A and 172B determine that device 100 is in the open position, they can generate a signal that can be used to trigger different events such as displaying information on both screens 104 and 108. Additional events may be triggered if accelerometer 176 determines that device 100 is in a portrait position (FIG. 1B) as opposed to a landscape position (not shown).

Figure 1H:
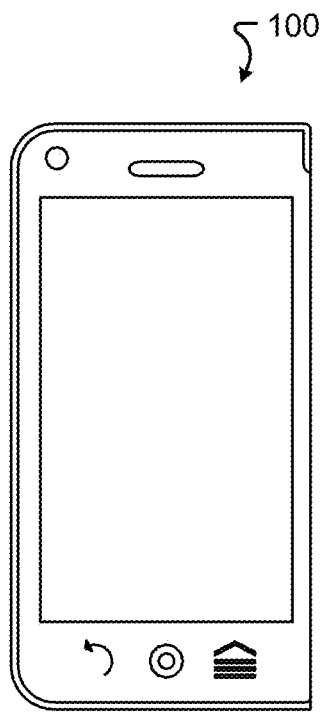
FIG. 1H includes a eighth view of an embodiment of a multi-screen user device.

In addition to the open position, device 100 may also have a "closed" position illustrated in FIG. 1H. Again, position sensors 172A and 172B can generate a signal indicating that device 100 is in the "closed" position. This can trigger an event that results in a change of displayed information on screen 104 and/or 108. For example, device 100 may be programmed to stop displaying information on one of the screens, e.g., screen 108, since a user can only view one screen at a time when device 100 is in the "closed" position. In other embodiments, the signal generated by position sensors 172A and 172B, indicating that the device 100 is in the "closed" position, can trigger device 100 to answer an incoming telephone call. The "closed" position can also be a preferred position for utilizing the device 100 as a mobile phone.

Figure 1I:
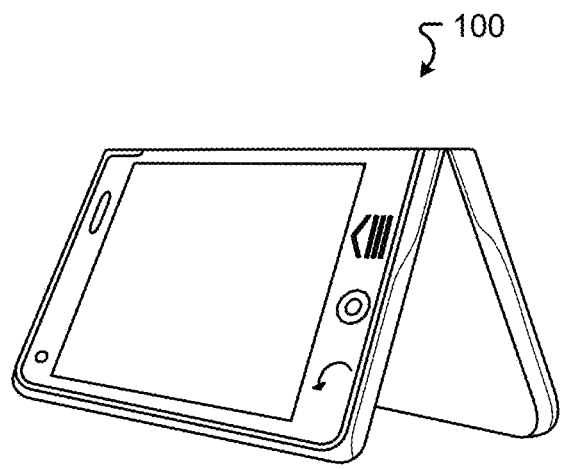
FIG. 1I includes a ninth view of an embodiment of a multi-screen user device.

Device 100 can also be used in an "easel" position which is illustrated in FIG. 1I. In the "easel" position, screens 104 and 108 are angled with respect to each other and facing outward with the edges of screens 104 and 108 substantially horizontal. In this position, device 100 can be configured to display information on both screens 104 and 108 to allow two users to simultaneously interact with device 100. When device 100 is in the "easel" position, sensors 172A and 172B generate a signal indicating that the screens 104 and 108 are positioned at an angle to each other, and the accelerometer 176 can generate a signal indicating that device 100 has been placed so that the edge of screens 104 and 108 are substantially horizontal. The signals can then be used in combination to generate events that trigger changes in the display of information on screens 104 and 108.

Figure 1J:
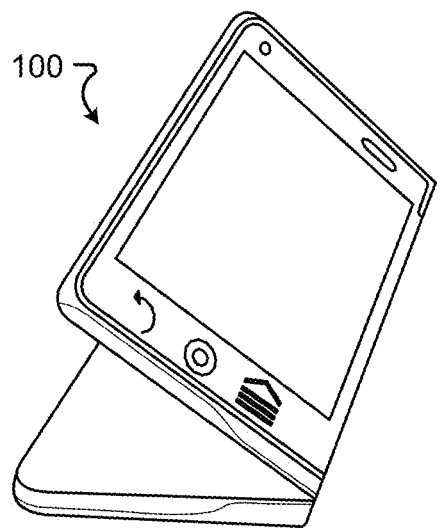
FIG. 1J includes a tenth view of an embodiment of a multi-screen user device.

FIG. 1J illustrates device 100 in a "modified easel" position. In the "modified easel" position, one of screens 104 or 108 is used as a stand and is faced down on the surface of an object such as a table. This position provides a convenient way for information to be displayed to a user in landscape orientation. Similar to the easel position, when device 100 is in the "modified easel" position, position sensors 172A and 172B generate a signal indicating that the screens 104 and 108 are positioned at an angle to each other. The accelerometer 176 would generate a signal indicating that device 100 has been positioned so that one of screens 104 and 108 is faced downwardly and is substantially horizontal. The signals can then be used to generate events that trigger changes in the display of information of screens 104 and 108. For example, information may not be displayed on the screen that is face down since a user cannot see the screen.

Transitional states are also possible. When the position sensors 172A and B and/or accelerometer indicate that the screens are being closed or folded (from open), a closing transitional state is recognized. Conversely when the position sensors 172A and B indicate that the screens are being opened or folded (from closed), an opening transitional state is recognized. The closing and opening transitional states are typically time-based, or have a maximum time duration from a sensed starting point. Normally, no user input is possible when one of the closing and opening states is in effect. In this manner, incidental user contact with a screen during the closing or opening function is not misinterpreted as user input. In embodiments, another transitional state is possible when the device 100 is closed. This additional transitional state allows the display to switch from one screen 104 to the second screen 108 when the device 100 is closed based on some user input, e.g., a double tap on the screen 110,114.

As can be appreciated, the description of device 100 is made for illustrative purposes only, and the embodiments are not limited to the specific mechanical features shown in FIGS. 1A-1J and described above. In other embodiments, device 100 may include additional features, including one or more additional buttons, slots, display areas, hinges, and/or locking mechanisms. Additionally, in embodiments, the features described above may be located in different parts of device 100 and still provide similar functionality. Therefore, FIGS. 1A-1J and the description provided above are non-limiting.

Figure 2:
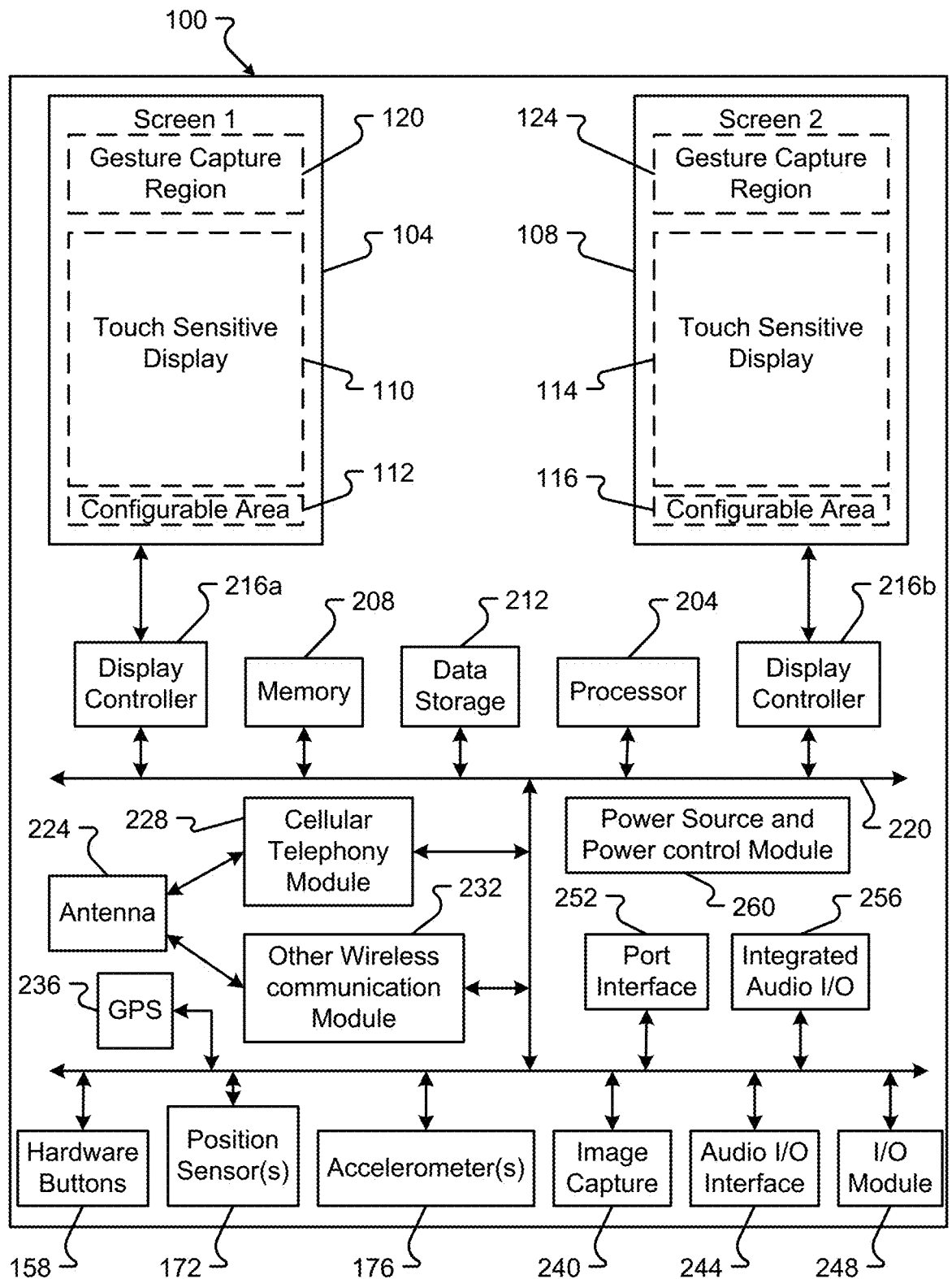
FIG. 2 is a block diagram of an embodiment of the hardware of the device.

Hardware Features:

FIG. 2 illustrates components of a device 100 in accordance with embodiments of the present disclosure. In general, the device 100 includes a primary screen 104 and a secondary screen 108. While the primary screen 104 and its components are normally enabled in both the opened and closed positions or states, the secondary screen 108 and its components are normally enabled in the opened state but disabled in the closed state. However, even when in the closed state a user or application triggered interrupt (such as in response to a phone application or camera application operation) can flip the active screen, or disable the primary screen 104 and enable the secondary screen 108, by a suitable command. Each screen 104, 108 can be touch sensitive and can include different operative areas. For example, a first operative area, within each touch sensitive screen 104 and 108, may comprise a touch sensitive display 110, 114. In general, the touch sensitive display 110, 114 may comprise a full color, touch sensitive display. A second area within each touch sensitive screen 104 and 108 may comprise a gesture capture region 120, 124. The gesture capture region 120, 124 may comprise an area or region that is outside of the touch sensitive display 110, 114 area, and that is capable of receiving input, for example in the form of gestures provided by a user. However, the gesture capture region 120, 124 does not include pixels that can perform a display function or capability.

A third region of the touch sensitive screens 104 and 108 may comprise a configurable area 112, 116. The configurable area 112, 116 is capable of receiving input and has display or limited display capabilities. In embodiments, the configurable area 112, 116 may present different input options to the user. For example, the configurable area 112, 116 may display buttons or other relatable items. Moreover, the identity of displayed buttons, or whether any buttons are displayed at all within the configurable area 112, 116 of a touch sensitive screen 104 or 108, may be determined from the context in which the device 100 is used and/or operated. In an exemplary embodiment, the touch sensitive screens 104 and 108 comprise liquid crystal display devices extending across at least those regions of the touch sensitive screens 104 and 108 that are capable of providing visual output to a user, and a capacitive input matrix over those regions of the touch sensitive screens 104 and 108 that are capable of receiving input from the user.

One or more display controllers 216a, 216b may be provided for controlling the operation of the touch sensitive screens 104 and 108, including input (touch sensing) and output (display) functions. In the exemplary embodiment illustrated in FIG. 2, a separate touch screen controller 216a or 216b is provided for each touch screen 104 and 108. In accordance with alternate embodiments, a common or shared touch screen controller may be used to control each of the included touch sensitive screens 104 and 108. In accordance with still other embodiments, the functions of a touch screen controller may be incorporated into other components, such as a processor 204.

The processor 204 may comprise a general purpose programmable processor or controller for executing application programming or instructions. In accordance with at least some embodiments, the processor 204 may include multiple processor cores, and/or implement multiple virtual processors. In accordance with still other embodiments, the processor 204 may include multiple physical processors. As a particular example, the processor 204 may comprise a specially configured application specific integrated circuit (ASIC) or other integrated circuit, a digital signal processor, a controller, a hardwired electronic or logic circuit, a programmable logic device or gate array, a special purpose computer, or the like. The processor 204 generally functions to run programming code or instructions implementing various functions of the device 100.

A communication device 100 may also include memory 208 for use in connection with the execution of application programming or instructions by the processor 204, and for the temporary or long term storage of program instructions and/or data. As examples, the memory 208 may comprise RAM, DRAM, SDRAM, or other solid state memory. Alternatively or in addition, data storage 212 may be provided. Like the memory 208, the data storage 212 may comprise a solid state memory device or devices. Alternatively or in addition, the data storage 212 may comprise a hard disk drive or other random access memory.

In support of communications functions or capabilities, the device 100 can include a cellular telephony module 228. As examples, the cellular telephony module 228 can comprise a GSM, CDMA, FDMA and/or analog cellular telephony transceiver capable of supporting voice, multimedia and/or data transfers over a cellular network. Alternatively or in addition, the device 100 can include an additional or other wireless communications module 232. As examples, the other wireless communications module 232 can comprise a Wi-Fi, BLUETOOTH™, WiMax, infrared, or other wireless communications link. The cellular telephony module 228 and the other wireless communications module 232 can each be associated with a shared or a dedicated antenna 224.

A port interface 252 may be included. The port interface 252 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 252 can support the supply of power to or from the device 100. The port interface 252 also comprises an intelligent element that comprises a docking module for controlling communications or other interactions between the device 100 and a connected device or component.

An input/output module 248 and associated ports may be included to support communications over wired networks or links, for example with other communication devices, server devices, and/or peripheral devices. Examples of an input/output module 248 include an Ethernet port, a Universal Serial Bus (USB) port, Institute of Electrical and Electronics Engineers (IEEE) 1394, or other interface.

An audio input/output interface/device(s) 244 can be included to provide analog audio to an interconnected speaker or other device, and to receive analog audio input from a connected microphone or other device. As an example, the audio input/output interface/device(s) 244 may comprise an associated amplifier and analog to digital converter. Alternatively or in addition, the device 100 can include an integrated audio input/output device 256 and/or an audio jack for interconnecting an external speaker or microphone. For example, an integrated speaker and an integrated microphone can be provided, to support near talk or speaker phone operations.

Hardware buttons 158 can be included for example for use in connection with certain control operations. Examples include a master power switch, volume control, etc., as described in conjunction with FIGS. 1A through 1J. One or more image capture interfaces/devices 240, such as a camera, can be included for capturing still and/or video images. Alternatively or in addition, an image capture interface/device 240 can include a scanner or code reader. An image capture interface/device 240 can include or be associated with additional elements, such as a flash or other light source.

The device 100 can also include a global positioning system (GPS) receiver 236. In accordance with embodiments of the present invention, the GPS receiver 236 may further comprise a GPS module that is capable of providing absolute location information to other components of the device 100. An accelerometer(s) 176 may also be included. For example, in connection with the display of information to a user and/or other functions, a signal from the accelerometer 176 can be used to determine an orientation and/or format in which to display that information to the user.

Embodiments of the present invention can also include one or more position sensor(s) 172. The position sensor 172 can provide a signal indicating the position of the touch sensitive screens 104 and 108 relative to one another. This information can be provided as an input, for example to a user interface application, to determine an operating mode, characteristics of the touch sensitive displays 110, 114, and/or other device 100 operations. As examples, a screen position sensor 172 can comprise a series of Hall effect sensors, a multiple position switch, an optical switch, a Wheatstone bridge, a potentiometer, or other arrangement capable of providing a signal indicating of multiple relative positions the touch screens are in.

Communications between various components of the device 100 can be carried by one or more buses 222. In addition, power can be supplied to the components of the device 100 from a power source and/or power control module 260. The power control module 260 can, for example, include a battery, an AC to DC converter, power control logic, and/or ports for interconnecting the device 100 to an external source of power.

Figure 3A:
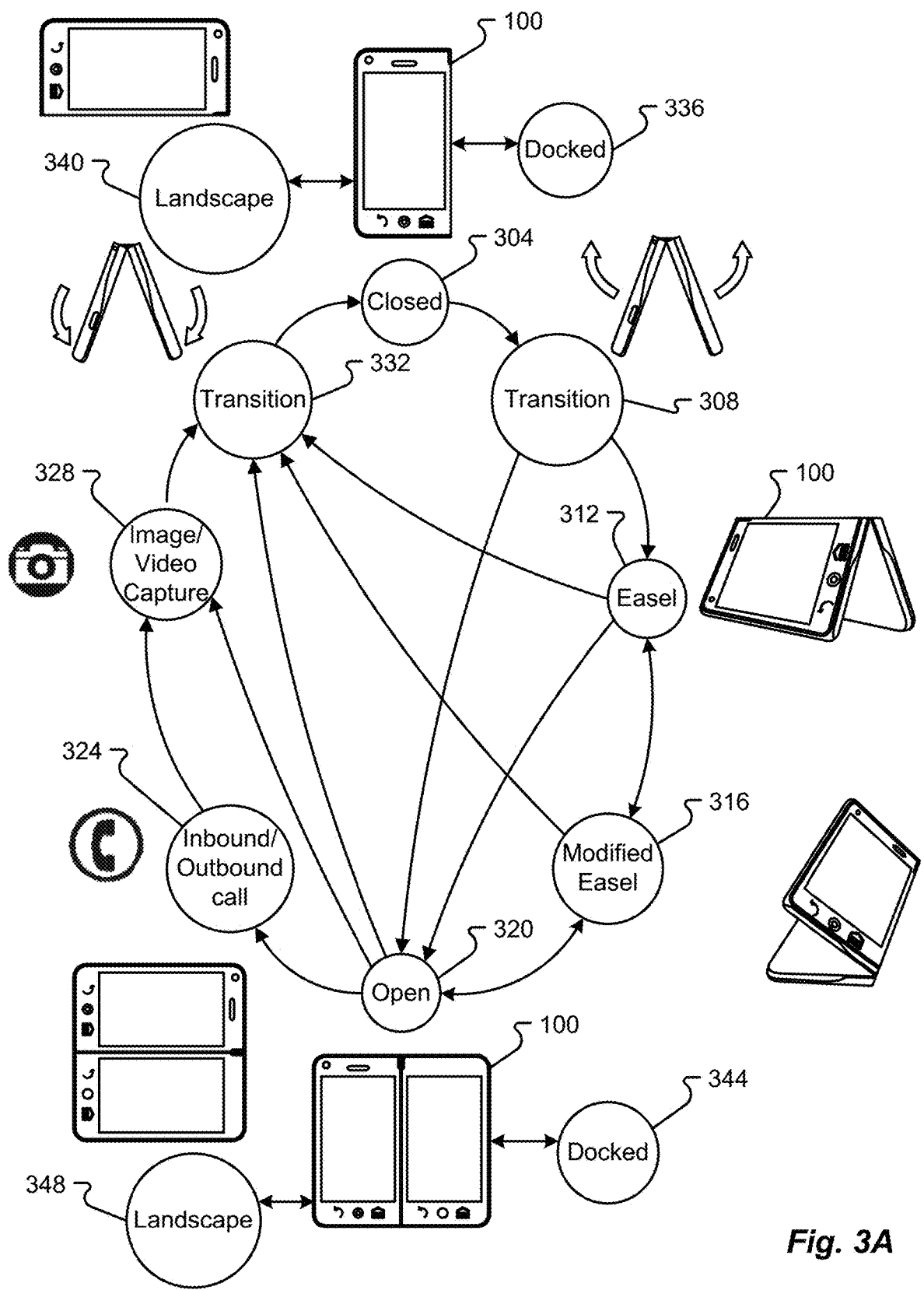
FIG. 3A is a block diagram of an embodiment of the state model for the device based on the device's orientation and/or configuration.

Device State:

FIGS. 3A and 3B represent illustrative states of device 100. While a number of illustrative states are shown, and transitions from a first state to a second state, it is to be appreciated that the illustrative state diagram may not encompass all possible states and/or all possible transitions from a first state to a second state. As illustrated in FIG. 3, the various arrows between the states (illustrated by the state represented in the circle) represent a physical change that occurs to the device 100, that is detected by one or more of hardware and software, the detection triggering one or more of a hardware and/or software interrupt that is used to control and/or manage one or more functions of device 100.

As illustrated in FIG. 3A, there are twelve exemplary "physical" states: closed 304, transition 308 (or opening transitional state), easel 312, modified easel 316, open 320, inbound/outbound call or communication 324, image/video capture 328, transition 332 (or closing transitional state), landscape 340, docked 336, docked 344 and landscape 348. Next to each illustrative state is a representation of the physical state of the device 100 with the exception of states 324 and 328, where the state is generally symbolized by the international icon for a telephone and the icon for a camera, respectfully.

In state 304, the device is in a closed state with the device 100 generally oriented in the portrait direction with the primary screen 104 and the secondary screen 108 back-to-back in different planes (see FIG. 1H). From the closed state, the device 100 can enter, for example, docked state 336, where the device 100 is coupled with a docking station, docking cable, or in general docked or associated with one or more other devices or peripherals, or the landscape state 340, where the device 100 is generally oriented with the primary screen 104 facing the user, and the primary screen 104 and the secondary screen 108 being back-to-back.

In the closed state, the device can also move to a transitional state where the device remains closed but the display is moved from one screen 104 to another screen 108 based on a user input, e.g., a double tap on the screen 110, 114. Still another embodiment includes a bilateral state. In the bilateral state, the device remains closed, but a single application displays at least one window on both the first display 110 and the second display 114. The windows shown on the first and second display 110, 114 may be the same or different based on the application and the state of that application. For example, while acquiring an image with a camera, the device may display the view finder on the first display 110 and displays a preview for the photo subjects (full screen and mirrored left-to-right) on the second display 114.

In state 308, a transition state from the closed state 304 to the semi-open state or easel state 312, the device 100 is shown opening with the primary screen 104 and the secondary screen 108 being rotated around a point of axis coincidence with the hinge. Upon entering the easel state 312, the primary screen 104 and the secondary screen 108 are separated from one another such that, for example, the device 100 can sit in an easel-like configuration on a surface.

In state 316, known as the modified easel position, the device 100 has the primary screen 104 and the secondary screen 108 in a similar relative relationship to one another as in the easel state 312, with the difference being one of the primary screen 104 or the secondary screen 108 are placed on a surface as shown.

State 320 is the open state where the primary screen 104 and the secondary screen 108 are generally on the same plane. From the open state, the device 100 can transition to the docked state 344 or the open landscape state 348. In the open state 320, the primary screen 104 and the secondary screen 108 are generally in the portrait-like orientation while in landscaped state 348 the primary screen 104 and the secondary screen 108 are generally in a landscape-like orientation.

State 324 is illustrative of a communication state, such as when an inbound or outbound call is being received or placed, respectively, by the device 100. While not illustrated for clarity, it should be appreciated the device 100 can transition to the inbound/outbound call state 324 from any state illustrated in FIG. 3. In a similar manner, the image/video capture state 328 can be entered into from any other state in FIG. 3, with the image/video capture state 328 allowing the device 100 to take one or more images via a camera and/or videos with a video capture device 240.

Transition state 332 illustratively shows primary screen 104 and the secondary screen 108 being closed upon one another for entry into, for example, the closed state 304.

FIG. 3B illustrates, with reference to the key, the inputs that are received to detect a transition from a first state to a second state. In FIG. 3B, various combinations of states are shown with in general, a portion of the columns being directed toward a portrait state 352, a landscape state 356, and a portion of the rows being directed to portrait state 360 and landscape state 364.

In FIG. 3B, the Key indicates that "H" represents an input from one or more Hall Effect sensors, "A" represents an input from one or more accelerometers, "T" represents an input from a timer, "P" represents a communications trigger input and "I" represents an image and/or video capture request input. Thus, in the center portion 376 of the chart, an input, or combination of inputs, are shown that represent how the device 100 detects a transition from a first physical state to a second physical state.

As discussed, in the center portion of the chart 376, the inputs that are received enable the detection of a transition from, for example, a portrait open state to a landscape easel state—shown in bold—"HAT." For this exemplary transition from the portrait open to the landscape easel state, a Hall Effect sensor ("H"), an accelerometer ("A") and a timer ("T") input may be needed. The timer input can be derived from, for example, a clock associated with the processor.

In addition to the portrait and landscape states, a docked state 368 is also shown that is triggered based on the receipt of a docking signal 372. As discussed above and in relation to FIG. 3, the docking signal can be triggered by the association of the device 100 with one or more other device 100s, accessories, peripherals, smart docks, or the like.

User Interaction:

FIGS. 4A through 4H depict various graphical representations of gesture inputs that may be recognized by the screens 104, 108. The gestures may be performed not only by a user's body part, such as a digit, but also by other devices, such as a stylus, that may be sensed by the contact sensing portion(s) of a screen 104, 108. In general, gestures are interpreted differently, based on where the gestures are performed (either directly on the display 110, 114 or in the gesture capture region 120, 124). For example, gestures in the display 110,114 may be directed to a desktop or application, and gestures in the gesture capture region 120, 124 may be interpreted as for the system.

With reference to FIGS. 4A-4H, a first type of gesture, a touch gesture 420, is substantially stationary on the screen 104,108 for a selected length of time. A circle 428 represents a touch or other contact type received at particular location of a contact sensing portion of the screen. The circle 428 may include a border 432, the thickness of which indicates a length of time that the contact is held substantially stationary at the contact location. For instance, a tap 420 (or short press) has a thinner border 432a than the border 432b for a long press 424 (or for a normal press). The long press 424 may involve a contact that remains substantially stationary on the screen for longer time period than that of a tap 420. As will be appreciated, differently defined gestures may be registered depending upon the length of time that the touch remains stationary prior to contact cessation or movement on the screen.

Figure 4A:
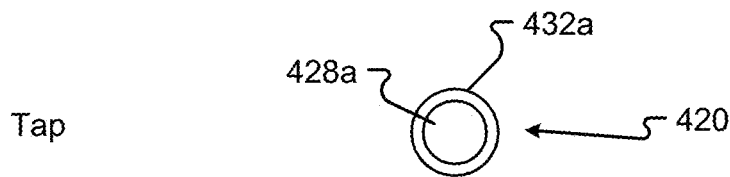
FIG. 4A is a first representation of an embodiment of user gesture received at a device.
Figure 4B:
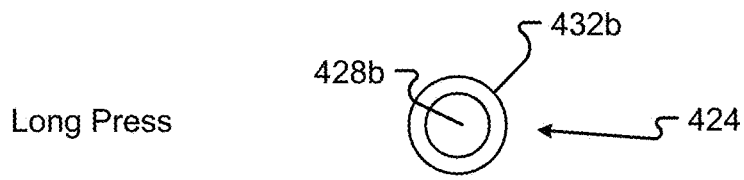
FIG. 4B is a second representation of an embodiment of user gesture received at a device.
Figure 4C:
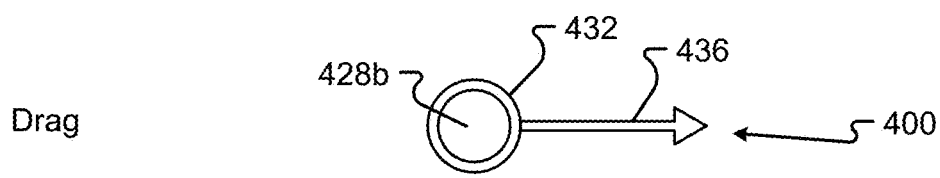
FIG. 4C is a third representation of an embodiment of user gesture received at a device.

With reference to FIG. 4C, a drag gesture 400 on the screen 104,108 is an initial contact (represented by circle 428) with contact movement 436 in a selected direction. The initial contact 428 may remain stationary on the screen 104,108 for a certain amount of time represented by the border 432. The drag gesture typically requires the user to contact an icon, window, or other displayed image at a first location followed by movement of the contact in a drag direction to a new second location desired for the selected displayed image. The contact movement need not be in a straight line but have any path of movement so long as the contact is substantially continuous from the first to the second locations.

Figure 4D:
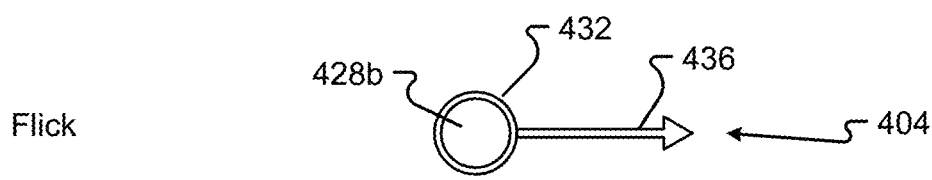
FIG. 4D is a fourth representation of an embodiment of user gesture received at a device.

With reference to FIG. 4D, a flick gesture 404 on the screen 104,108 is an initial contact (represented by circle 428) with truncated contact movement 436 (relative to a drag gesture) in a selected direction. In embodiments, a flick has a higher exit velocity for the last movement in the gesture compared to the drag gesture. The flick gesture can, for instance, be a finger snap following initial contact. Compared to a drag gesture, a flick gesture generally does not require continual contact with the screen 104,108 from the first location of a displayed image to a predetermined second location. The contacted displayed image is moved by the flick gesture in the direction of the flick gesture to the predetermined second location. Although both gestures commonly can move a displayed image from a first location to a second location, the temporal duration and distance of travel of the contact on the screen is generally less for a flick than for a drag gesture.

Figure 4E:
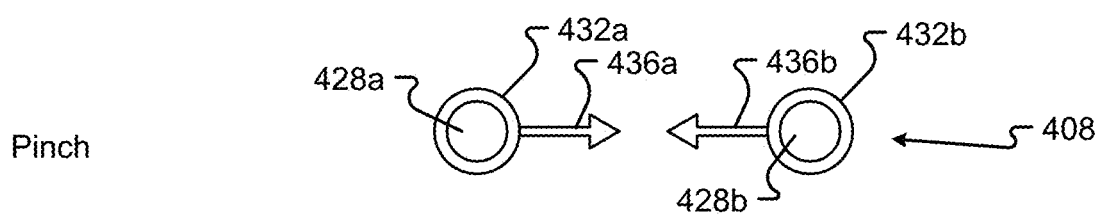
FIG. 4E is a fifth representation of an embodiment of user gesture received at a device.

With reference to FIG. 4E, a pinch gesture 408 on the screen 104,108 is depicted. The pinch gesture 408 may be initiated by a first contact 428 a to the screen 104,108 by, for example, a first digit and a second contact 428b to the screen 104,108 by, for example, a second digit. The first and second contacts 428a,b may be detected by a common contact sensing portion of a common screen 104,108, by different contact sensing portions of a common screen 104 or 108, or by different contact sensing portions of different screens. The first contact 428a is held for a first amount of time, as represented by the border 432a, and the second contact 428b is held for a second amount of time, as represented by the border 432b. The first and second amounts of time are generally substantially the same, and the first and second contacts 428 a, b generally occur substantially simultaneously. The first and second contacts 428 a, b generally also include corresponding first and second contact movements 436 a, b, respectively. The first and second contact movements 436 a, b are generally in opposing directions. Stated another way, the first contact movement 436a is towards the second contact 436b, and the second contact movement 436b is towards the first contact 436a. More simply stated, the pinch gesture 408 may be accomplished by a user's digits touching the screen 104,108 in a pinching motion.

Figure 4F:
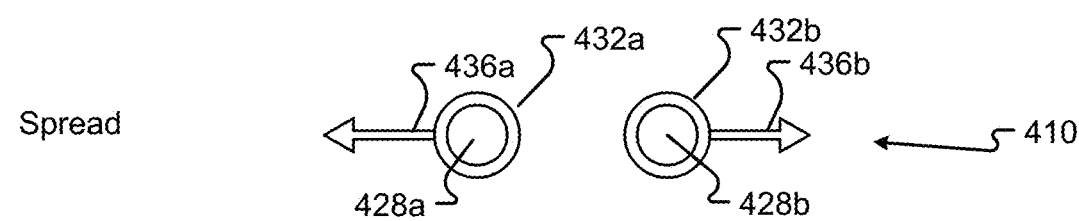
FIG. 4F is a sixth representation of an embodiment of user gesture received at a device.

With reference to FIG. 4F, a spread gesture 410 on the screen 104,108 is depicted. The spread gesture 410 may be initiated by a first contact 428a to the screen 104,108 by, for example, a first digit and a second contact 428b to the screen 104,108 by, for example, a second digit. The first and second contacts 428a,b may be detected by a common contact sensing portion of a common screen 104,108, by different contact sensing portions of a common screen 104,108, or by different contact sensing portions of different screens. The first contact 428a is held for a first amount of time, as represented by the border 432a, and the second contact 428b is held for a second amount of time, as represented by the border 432b. The first and second amounts of time are generally substantially the same, and the first and second contacts 428 a, b generally occur substantially simultaneously. The first and second contacts 428 a, b generally also include corresponding first and second contact movements 436a, b, respectively. The first and second contact movements 436 a, b are generally in a common direction. Stated another way, the first and second contact movements 436 a, b are away from the first and second contacts 428a, b. More simply stated, the spread gesture 410 may be accomplished by a user's digits touching the screen 104,108 in a spreading motion.

Figure 4G:
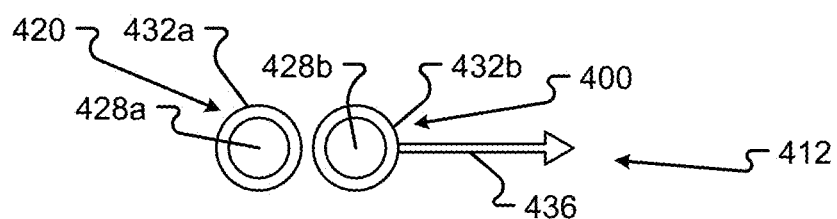
FIG. 4G is a seventh representation of an embodiment of user gesture received at a device.
Figure 4H:
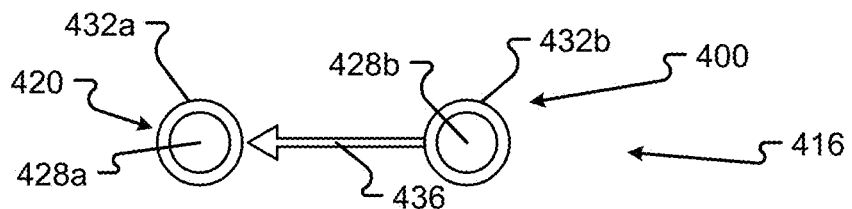
FIG. 4H is a eighth representation of an embodiment of user gesture received at a device.

The above gestures may be combined in any manner, such as those shown by FIGS. 4G and 4H, to produce a determined functional result. For example, in FIG. 4G a tap gesture 420 is combined with a drag or flick gesture 412 in a direction away from the tap gesture 420. In FIG. 4H, a tap gesture 420 is combined with a drag or flick gesture 412 in a direction towards the tap gesture 420.

The functional result of receiving a gesture can vary depending on a number of factors, including a state of the device 100, display 110, 114, or screen 104, 108, a context associated with the gesture, or sensed location of the gesture. The state of the device commonly refers to one or more of a configuration of the device 100, a display orientation, and user and other inputs received by the device 100. Context commonly refers to one or more of the particular application(s) selected by the gesture and the portion(s) of the application currently executing, whether the application is a single- or multi-screen application, and whether the application is a multi-screen application displaying one or more windows in one or more screens or in one or more stacks. Sensed location of the gesture commonly refers to whether the sensed set(s) of gesture location coordinates are on a touch sensitive display 110, 114 or a gesture capture region 120, 124, whether the sensed set(s) of gesture location coordinates are associated with a common or different display or screen 104,108, and/or what portion of the gesture capture region contains the sensed set(s) of gesture location coordinates.

A tap, when received by an a touch sensitive display 110, 114, can be used, for instance, to select an icon to initiate or terminate execution of a corresponding application, to maximize or minimize a window, to reorder windows in a stack, and to provide user input such as by keyboard display or other displayed image. A drag, when received by a touch sensitive display 110, 114, can be used, for instance, to relocate an icon or window to a desired location within a display, to reorder a stack on a display, or to span both displays (such that the selected window occupies a portion of each display simultaneously). A flick, when received by a touch sensitive display 110, 114 or a gesture capture region 120, 124, can be used to relocate a window from a first display to a second display or to span both displays (such that the selected window occupies a portion of each display simultaneously). Unlike the drag gesture, however, the flick gesture is generally not used to move the displayed image to a specific user-selected location but to a default location that is not configurable by the user.

The pinch gesture, when received by a touch sensitive display 110, 114 or a gesture capture region 120, 124, can be used to maximize or otherwise increase the displayed area or size of a window (typically when received entirely by a common display), to switch windows displayed at the top of the stack on each display to the top of the stack of the other display (typically when received by different displays or screens), or to display an application manager (a "pop-up window" that displays the windows in the stack). The spread gesture, when received by a touch sensitive display 110, 114 or a gesture capture region 120, 124, can be used to minimize or otherwise decrease the displayed area or size of a window, to switch windows displayed at the top of the stack on each display to the top of the stack of the other display (typically when received by different displays or screens), or to display an application manager (typically when received by an off-screen gesture capture region on the same or different screens).

The combined gestures of FIG. 4G, when received by a common display capture region in a common display or screen 104,108, can be used to hold a first window stack location in a first stack constant for a display receiving the gesture while reordering a second window stack location in a second window stack to include a window in the display receiving the gesture. The combined gestures of FIG. 4H, when received by different display capture regions in a common display or screen 104,108 or in different displays or screens, can be used to hold a first window stack location in a first window stack constant for a display receiving the tap part of the gesture while reordering a second window stack location in a second window stack to include a window in the display receiving the flick or drag gesture. Although specific gestures and gesture capture regions in the preceding examples have been associated with corresponding sets of functional results, it is to be appreciated that these associations can be redefined in any manner to produce differing associations between gestures and/or gesture capture regions and/or functional results.

Firmware and Software:

The memory 508 may store and the processor 504 may execute one or more software components. These components can include at least one operating system (OS) 516a and/or 516b, a framework 520, and/or one or more applications 564a and/or 564b from an application store 560. The processor 504 may receive inputs from drivers 512, previously described in conjunction with FIG. 2. The OS 516 can be any software, consisting of programs and data, that manages computer hardware resources and provides common services for the execution of various applications 564. The OS 516 can be any operating system and, at least in some embodiments, dedicated to mobile devices, including, but not limited to, Linux, ANDROID™, iPhone OS (IOS™), WINDOWS PHONE 7™, etc. The OS 516 is operable to provide functionality to the phone by executing one or more operations, as described herein.

The applications 564 can be any higher level software that executes particular functionality for the user. Applications 564 can include programs such as email clients, web browsers, texting applications, games, media players, office suites, etc. The applications 564 can be stored in an application store 560, which may represent any memory or data storage, and the management software associated therewith, for storing the applications 564. Once executed, the applications 564 may be run in a different area of memory 508.

The framework 520 may be any software or data that allows the multiple tasks running on the device to interact. In embodiments, at least portions of the framework 520 and the discrete components described hereinafter may be considered part of the OS 516 or an application 564. However, these portions will be described as part of the framework 520, but those components are not so limited. The framework 520 can include, but is not limited to, a Multi-Display Management (MDM) module 524, a Surface Cache module 528, a Window Management module 532, an Input Management module 536, a Task Management module 540, a Display Controller, one or more frame buffers 548, a task stack 552, one or more window stacks 550 (which is a logical arrangement of windows and/or desktops in a display area), and/or an event buffer 556.

The MDM module 524 includes one or more modules that are operable to manage the display of applications or other data on the screens of the device. An embodiment of the MDM module 524 is described in conjunction with FIG. 5B. In embodiments, the MDM module 524 receives inputs from the OS 516, the drivers 512 and the applications 564. The inputs assist the MDM module 524 in determining how to configure and allocate the displays according to the application's preferences and requirements, and the user's actions. Once a determination for display configurations is determined, the MDM module 524 can bind the applications 564 to a display configuration. The configuration may then be provided to one or more other components to generate the display.

The Surface Cache module 528 includes any memory or storage and the software associated therewith to store or cache one or more images from the display screens. Each display screen may have associated with the screen a series of active and non-active windows (or other display objects (such as a desktop display)). The active window (or other display object) is currently being displayed. The non-active windows (or other display objects) were opened and/or at some time displayed but are now "behind" the active window (or other display object). To enhance the user experience, before being covered by another active window (or other display object), a "screen shot" of a last generated image of the window (or other display object) can be stored. The Surface Cache module 528 may be operable to store the last active image of a window (or other display object) not currently displayed. Thus, the Surface Cache module 528 stores the images of non-active windows (or other display objects) in a data store (not shown).

In embodiments, the Window Management module 532 is operable to manage the windows (or other display objects) that are active or not active on each of the screens. The Window Management module 532, based on information from the MDM module 524, the OS 516, or other components, determines when a window (or other display object) is active or not active. The Window Management module 532 may then put a non-visible window (or other display object) in a "not active state" and, in conjunction with the Task Management module Task Management 540 suspend the application's operation. Further, the Window Management module 532 may assign a screen identifier to the window (or other display object) or manage one or more other items of data associated with the window (or other display object). The Window Management module 532 may also provide the stored information to the application 564, the Task Management module 540, or other components interacting with or associated with the window (or other display object).

The Input Management module 536 is operable to manage events that occur with the device. An event is any input into the window environment, for example, a user interface interactions with a user. The Input Management module 536 receives the events and logically stores the events in an event buffer 556. Events can include such user interface interactions as a "down event," which occurs when a screen 104, 108 receives a touch signal from a user, a "move event," which occurs when the screen 104, 108 determines that a user's finger is moving across a screen(s), an "up event, which occurs when the screen 104, 108 determines that the user has stopped touching the screen 104, 108, etc. These events are received, stored, and forwarded to other modules by the Input Management module 536.

A task can be an application component that provides a screen with which users can interact in order to do something, such as dial the phone, take a photo, send an email, or view a map. Each task may be given a window in which to draw a user interface. The window typically fills the display 110,114, but may be smaller than the display 110,114 and float on top of other windows. An application usually consists of multiple activities that are loosely bound to each other. Typically, one task in an application is specified as the "main" task, which is presented to the user when launching the application for the first time. Each task can then start another task to perform different actions.

The Task Management module 540 is operable to manage the operation of the one or more applications 564 that may be executed by the device. Thus, the Task Management module 540 can receive signals to execute an application stored in the application store 560. The Task Management module 540 may then instantiate one or more tasks or components of the application 564 to begin operation of the application 564. Further, the Task Management module 540 may suspend the application 564 based on user interface changes. Suspending the application 564 may maintain application data in memory but may limit or stop access to processor cycles for the application 564. Once the application becomes active again, the Task Management module 540 can again provide access to the processor.

The Display Controller 544 is operable to render and output the display(s) for the multi-screen device. In embodiments, the Display Controller 544 creates and/or manages one or more frame buffers 548. A frame buffer 548 can be a display output that drives a display from a portion of memory containing a complete frame of display data. In embodiments, the Display Controller 544 manages one or more frame buffers. One frame buffer may be a composite frame buffer that can represent the entire display space of both screens. This composite frame buffer can appear as a single frame to the OS 516. The Display Controller 544 can sub-divide this composite frame buffer as required for use by each of the displays 110, 114. Thus, by using the Display Controller 544, the device 100 can have multiple screen displays without changing the underlying software of the OS 516.

The Application Manager 562 can be a service that provides the presentation layer for the window environment. Thus, the Application Manager 562 provides the graphical model for rendering by the Window Management Module 556. Likewise, the Desktop 566 provides the presentation layer for the Application Store 560. Thus, the desktop provides a graphical model of a surface having selectable application icons for the Applications 564 in the Application Store 560 that can be provided to the Window Management Module 556 for rendering.

Figure 5A:
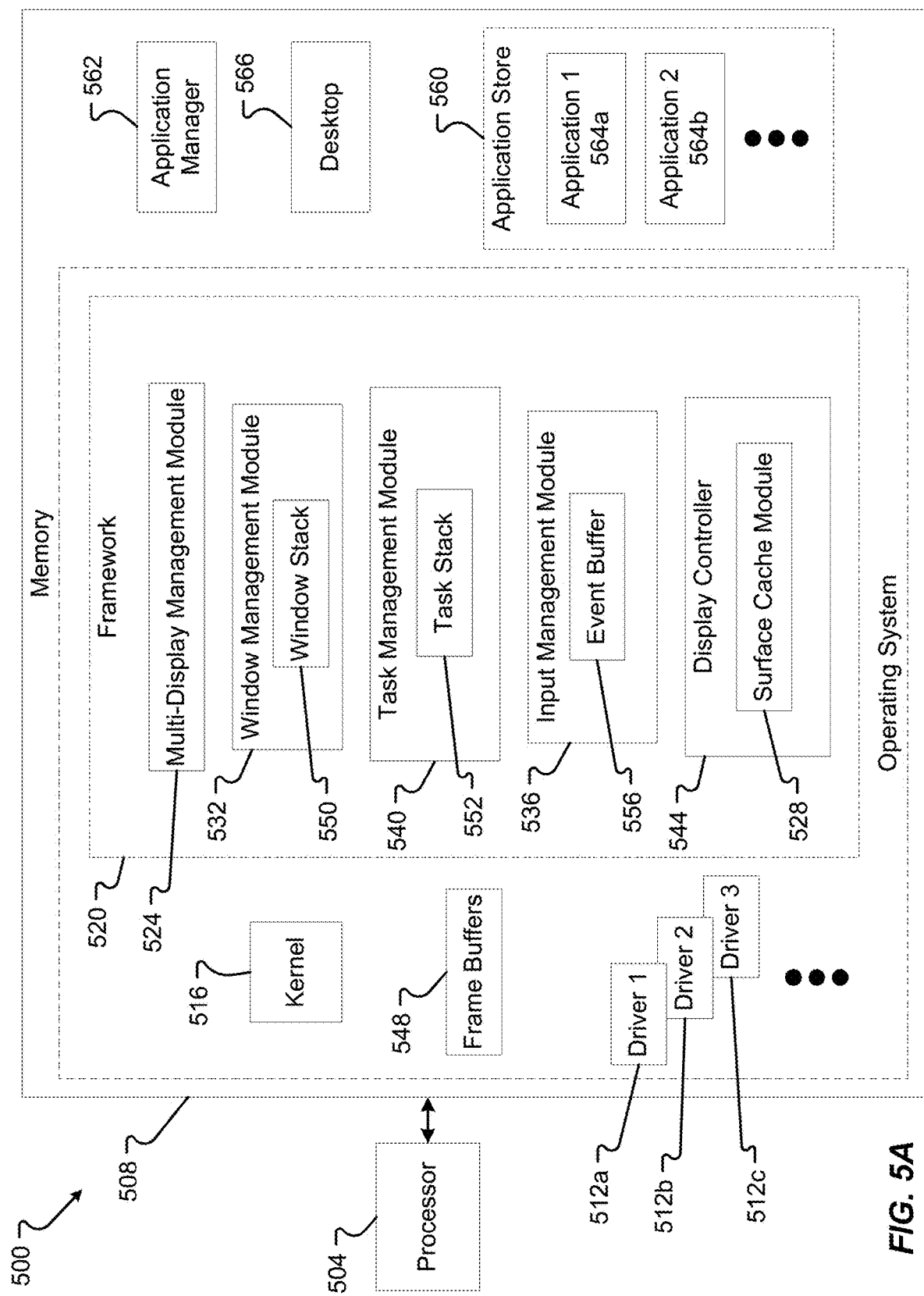
FIG. 5A is a block diagram of an embodiment of the device software and/or firmware.
Figure 5B:
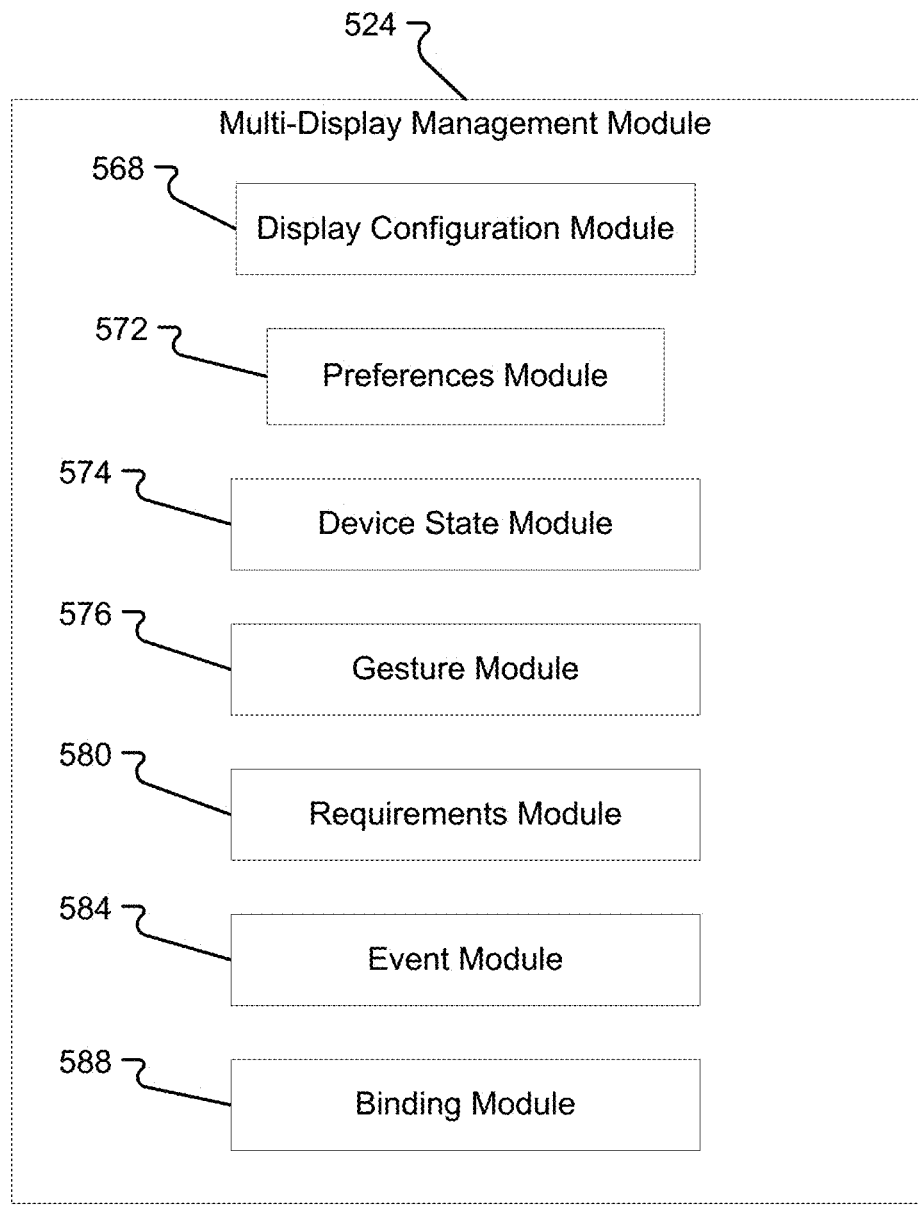
FIG. 5B is a second block diagram of an embodiment of the device software and/or firmware.

An embodiment of the MDM module 524 is shown in FIG. 5B. The MDM module 524 is operable to determine the state of the environment for the device, including, but not limited to, the orientation of the device, what applications 564 are executing, how the applications 564 are to be displayed, what actions the user is conducting, the tasks being displayed, etc. To configure the display, the MDM module 524 interprets these environmental factors and determines a display configuration, as described in conjunction with FIGS. 6A-6J. Then, the MDM module 524 can bind the applications 564 or other device components to the displays. The configuration may then be sent to the Display Controller 544 and/or the OS 516 to generate the display. The MDM module 524 can include one or more of, but is not limited to, a Display Configuration Module 568, a Preferences Module 572, a Device State Module 574, a Gesture Module 576, a Requirements Module 580, an Event Module 584, and/or a Binding Module 588.

The Display Configuration Module 568 determines the layout for the display. In embodiments, the Display Configuration Module 568 can determine the environmental factors. The environmental factors may be received from one or more other MDM module 524 modules or from other sources. The Display Configuration Module 568 can then determine from the list of factors the best configuration for the display. Some embodiments of the possible configurations and the factors associated therewith are described in conjunction with FIGS. 6A-6F.

The Preferences Module 572 is operable to determine display preferences for an application 564 or other component. For example, an application can have a preference for Single or Dual displays. The Preferences Module 572 can determine or receive the application preferences and store the preferences. As the configuration of the device changes, the preferences may be reviewed to determine if a better display configuration can be achieved for the application 564.

The Device State Module 574 is operable to determine or receive the state of the device. The state of the device can be as described in conjunction with FIGS. 3A and 3B. The state of the device can be used by the Display Configuration Module 568 to determine the configuration for the display. As such, the Device State Module 574 may receive inputs and interpret the state of the device. The state information is then provided to the Display Configuration Module 568.

The Gesture Module 576 is operable to determine if the user is conducting any actions on the user interface. Thus, the Gesture Module 576 can receive task information either from the task stack 552 or the Input Management module 536. These gestures may be as defined in conjunction with FIGS. 4A through 4H. For example, moving a window causes the display to render a series of display frames that illustrate the window moving. The gesture associated with such user interface interaction can be received and interpreted by the Gesture Module 576. The information about the user gesture is then sent to the Task Management Module 540 to modify the display binding of the task.

The Requirements Module 580, similar to the Preferences Module 572, is operable to determine display requirements for an application 564 or other component. An application can have a set display requirement that must be observed. Some applications require a particular display orientation. For example, the application "Angry Birds" can only be displayed in landscape orientation. This type of display requirement can be determined or received, by the Requirements Module 580. As the orientation of the device changes, the Requirements Module 580 can reassert the display requirements for the application 564. The Display Configuration Module 568 can generate a display configuration that is in accordance with the application display requirements, as provided by the Requirements Module 580.

The Event Module 584, similar to the Gesture Module 576, is operable to determine one or more events occurring with an application or other component that can affect the user interface. Thus, the Gesture Module 576 can receive event information either from the event buffer 556 or the Task Management module 540. These events can change how the tasks are bound to the displays. For example, an email application receiving an email can cause the display to render the new message in a secondary screen. The events associated with such application execution can be received and interpreted by the Event Module 584. The information about the events then may be sent to the Display Configuration Module 568 to modify the configuration of the display.

The Binding Module 588 is operable to bind the applications 564 or the other components to the configuration determined by the Display Configuration Module 568. A binding associates, in memory, the display configuration for each application with the display and mode of the application. Thus, the Binding Module 588 can associate an application with a display configuration for the application (e.g. landscape, portrait, multi-screen, etc.). Then, the Binding Module 588 may assign a display identifier to the display. The display identifier associated the application with a particular screen of the device. This binding is then stored and provided to the Display Controller 544, the OS 516, or other components to properly render the display. The binding is dynamic and can change or be updated based on configuration changes associated with events, gestures, state changes, application preferences or requirements, etc.

User Interface Configurations:

With reference now to FIGS. 6A-J, various types of output configurations made possible by the device 100 will be described hereinafter.

Figure 6B:
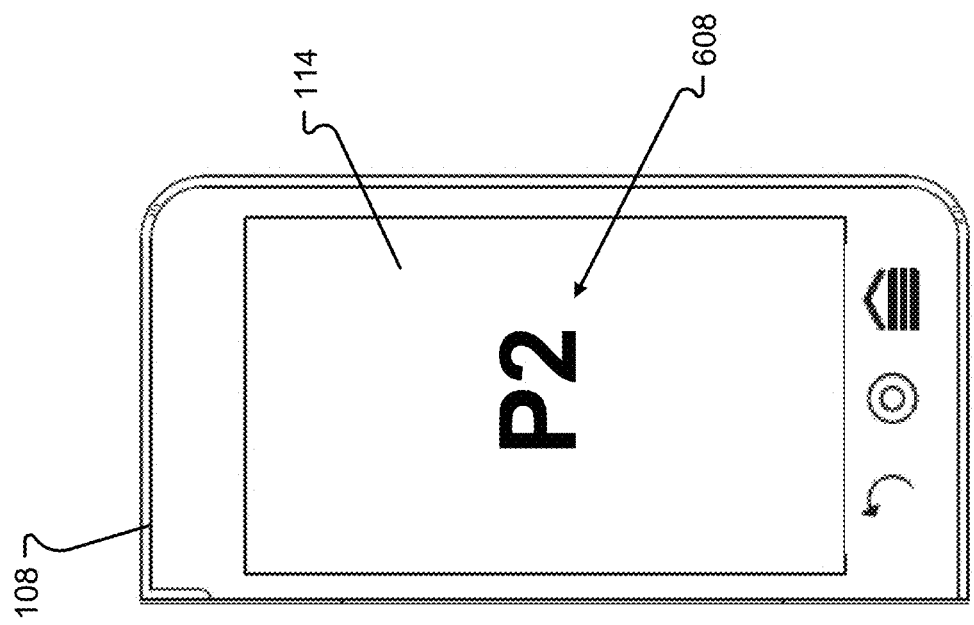
FIG. 6B is a second representation of an embodiment of a device configuration generated in response to the device state.
Figure 6A:
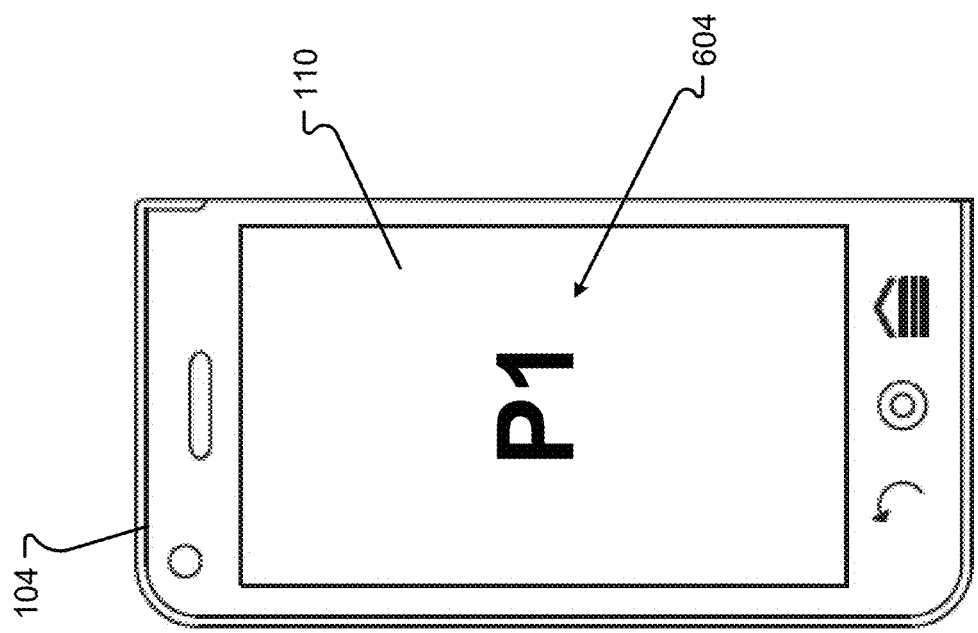
FIG. 6A is a first representation of an embodiment of a device configuration generated in response to the device state.

FIGS. 6A and 6B depict two different output configurations of the device 100 being in a first state. Specifically, FIG. 6A depicts the device 100 being in a closed portrait state 304 where the data is displayed on the primary screen 104. In this example, the device 100 displays data via the touch sensitive display 110 in a first portrait configuration 604. As can be appreciated, the first portrait configuration 604 may only display a desktop or operating system home screen. Alternatively, one or more windows may be presented in a portrait orientation while the device 100 is displaying data in the first portrait configuration 604.

FIG. 6B depicts the device 100 still being in the closed portrait state 304, but instead data is displayed on the secondary screen 108. In this example, the device 100 displays data via the touch sensitive display 114 in a second portrait configuration 608.

It may be possible to display similar or different data in either the first or second portrait configuration 604, 608. It may also be possible to transition between the first portrait configuration 604 and second portrait configuration 608 by providing the device 100 a user gesture (e.g., a double tap gesture), a menu selection, or other means. Other suitable gestures may also be employed to transition between configurations. Furthermore, it may also be possible to transition the device 100 from the first or second portrait configuration 604, 608 to any other configuration described herein depending upon which state the device 100 is moved.

Figure 6C:
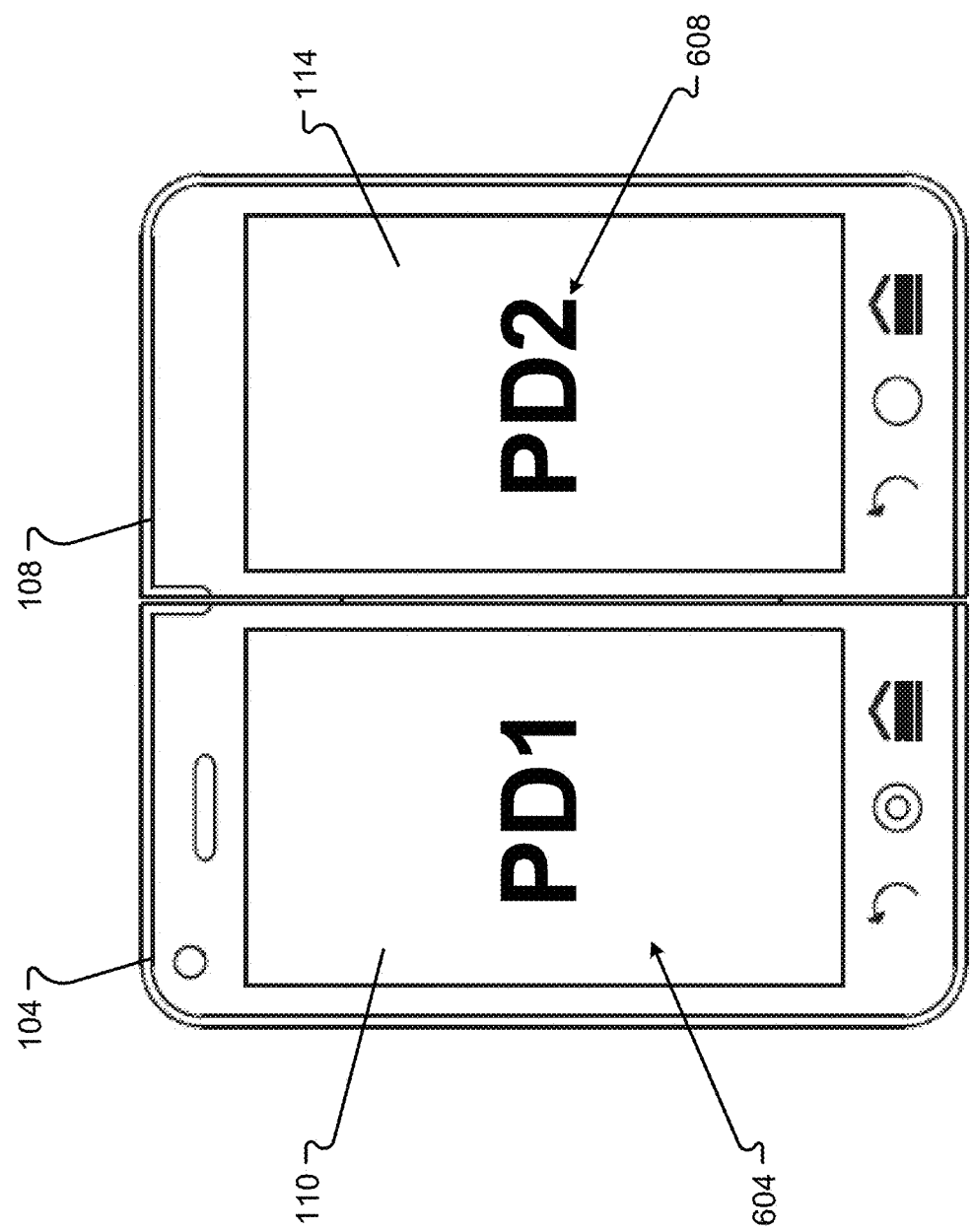
FIG. 6C is a third representation of an embodiment of a device configuration generated in response to the device state.

An alternative output configuration may be accommodated by the device 100 being in a second state. Specifically, FIG. 6C depicts a third portrait configuration where data is displayed simultaneously on both the primary screen 104 and the secondary screen 108. The third portrait configuration may be referred to as a Dual-Portrait (PD) output configuration. In the PD output configuration, the touch sensitive display 110 of the primary screen 104 depicts data in the first portrait configuration 604 while the touch sensitive display 114 of the secondary screen 108 depicts data in the second portrait configuration 608. The simultaneous presentation of the first portrait configuration 604 and the second portrait configuration 608 may occur when the device 100 is in an open portrait state 320. In this configuration, the device 100 may display one application window in one display 110 or 114, two application windows (one in each display 110 and 114), one application window and one desktop, or one desktop. Other configurations may be possible. It should be appreciated that it may also be possible to transition the device 100 from the simultaneous display of configurations 604, 608 to any other configuration described herein depending upon which state the device 100 is moved. Furthermore, while in this state, an application's display preference may place the device into bilateral mode, in which both displays are active to display different windows in the same application. For example, a Camera application may display a viewfinder and controls on one side, while the other side displays a mirrored preview that can be seen by the photo subjects. Games involving simultaneous play by two players may also take advantage of bilateral mode.

Figure 6E:
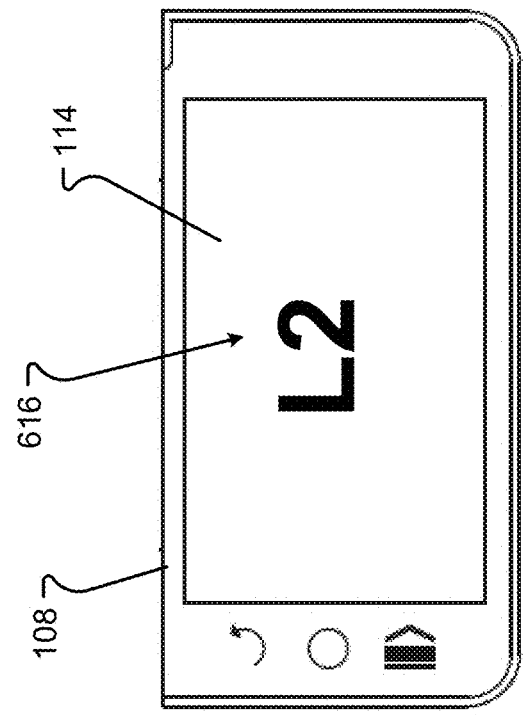
FIG. 6E is a fifth representation of an embodiment of a device configuration generated in response to the device state.
Figure 6D:
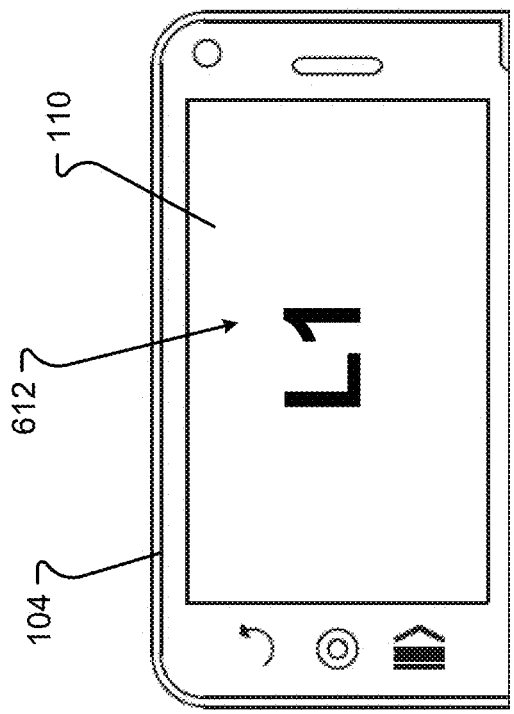
FIG. 6D is a fourth representation of an embodiment of a device configuration generated in response to the device state.

FIGS. 6D and 6E depicts two further output configurations of the device 100 being in a third state. Specifically, FIG. 6D depicts the device 100 being in a closed landscape state 340 where the data is displayed on the primary screen 104. In this example, the device 100 displays data via the touch sensitive display 110 in a first landscape configuration 612. Much like the other configurations described herein, the first landscape configuration 612 may display a desktop, a home screen, one or more windows displaying application data, or the like.

FIG. 6E depicts the device 100 still being in the closed landscape state 340, but instead data is displayed on the secondary screen 108. In this example, the device 100 displays data via the touch sensitive display 114 in a second landscape configuration 616. It may be possible to display similar or different data in either the first or second portrait configuration 612, 616. It may also be possible to transition between the first landscape configuration 612 and second landscape configuration 616 by providing the device 100 with one or both of a twist and tap gesture or a flip and slide gesture. Other suitable gestures may also be employed to transition between configurations. Furthermore, it may also be possible to transition the device 100 from the first or second landscape configuration 612, 616 to any other configuration described herein depending upon which state the device 100 is moved.

Figure 6F:
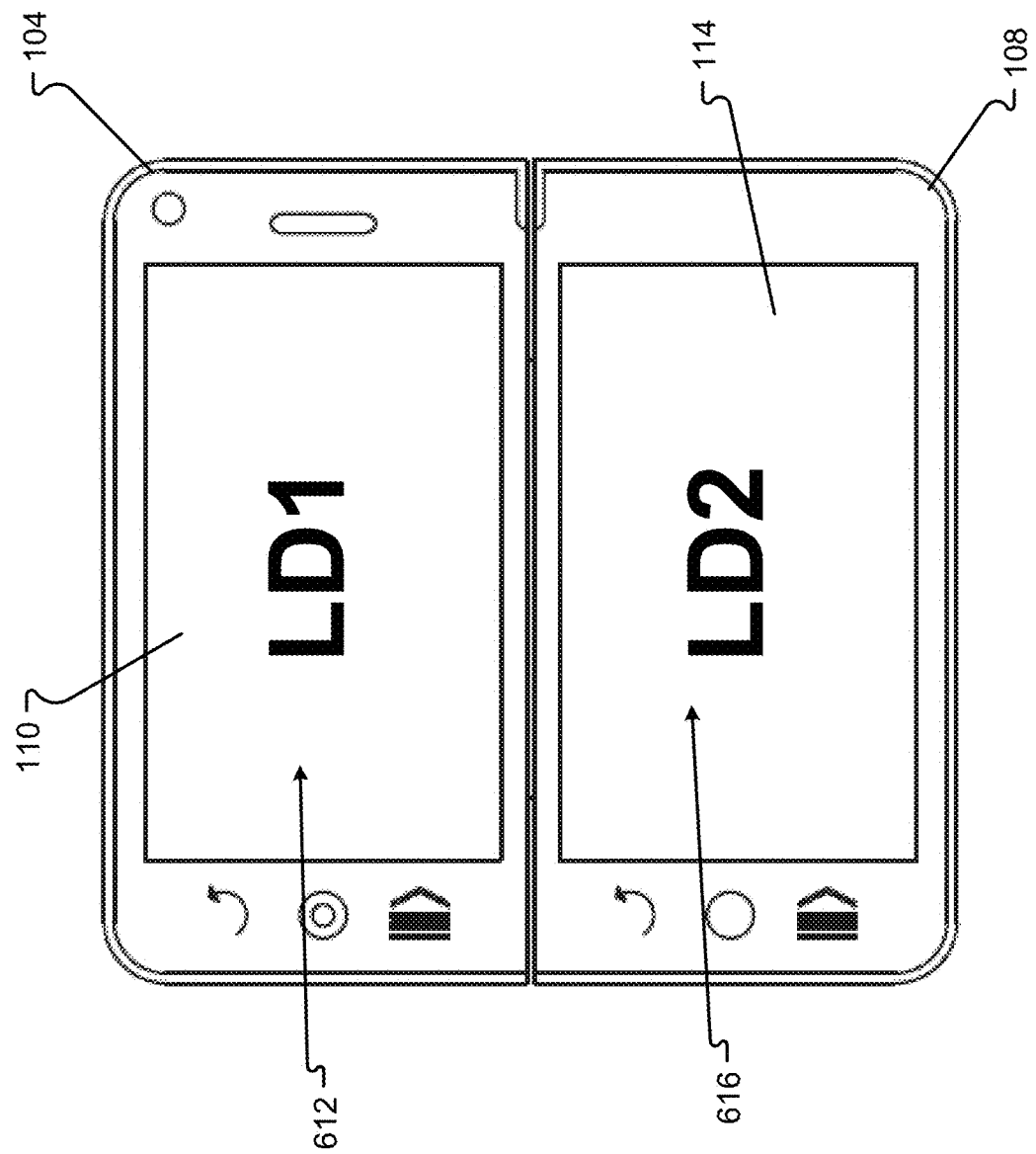
FIG. 6F is a sixth representation of an embodiment of a device configuration generated in response to the device state.

FIG. 6F depicts a third landscape configuration where data is displayed simultaneously on both the primary screen 104 and the secondary screen 108. The third landscape configuration may be referred to as a Dual-Landscape (LD) output configuration. In the LD output configuration, the touch sensitive display 110 of the primary screen 104 depicts data in the first landscape configuration 612 while the touch sensitive display 114 of the secondary screen 108 depicts data in the second landscape configuration 616. The simultaneous presentation of the first landscape configuration 612 and the second landscape configuration 616 may occur when the device 100 is in an open landscape state 340. It should be appreciated that it may also be possible to transition the device 100 from the simultaneous display of configurations 612, 616 to any other configuration described herein depending upon which state the device 100 is moved.

FIGS. 6G and 6H depict two views of a device 100 being in yet another state. Specifically, the device 100 is depicted as being in an easel state 312. FIG. 6G shows that a first easel output configuration 618 may be displayed on the touch sensitive display 110. FIG. 6H shows that a second easel output configuration 620 may be displayed on the touch sensitive display 114. The device 100 may be configured to depict either the first easel output configuration 618 or the second easel output configuration 620 individually. Alternatively, both the easel output configurations 618, 620 may be presented simultaneously. In some embodiments, the easel output configurations 618, 620 may be similar or identical to the landscape output configurations 612, 616. The device 100 may also be configured to display one or both of the easel output configurations 618, 620 while in a modified easel state 316. It should be appreciated that simultaneous utilization of the easel output configurations 618, 620 may facilitate two-person games (e.g., Battleship®, chess, checkers, etc.), multi-user conferences where two or more users share the same device 100, and other applications. As can be appreciated, it may also be possible to transition the device 100 from the display of one or both configurations 618, 620 to any other configuration described herein depending upon which state the device 100 is moved.

FIG. 6I depicts yet another output configuration that may be accommodated while the device 100 is in an open portrait state 320. Specifically, the device 100 may be configured to present a single continuous image across both touch sensitive displays 110, 114 in a portrait configuration referred to herein as a Portrait-Max (PMax) configuration 624. In this configuration, data (e.g., a single image, application, window, icon, video, etc.) may be split and displayed partially on one of the touch sensitive displays while the other portion of the data is displayed on the other touch sensitive display. The Pmax configuration 624 may facilitate a larger display and/or better resolution for displaying a particular image on the device 100. Similar to other output configurations, it may be possible to transition the device 100 from the Pmax configuration 624 to any other output configuration described herein depending upon which state the device 100 is moved.

Figure 6J:
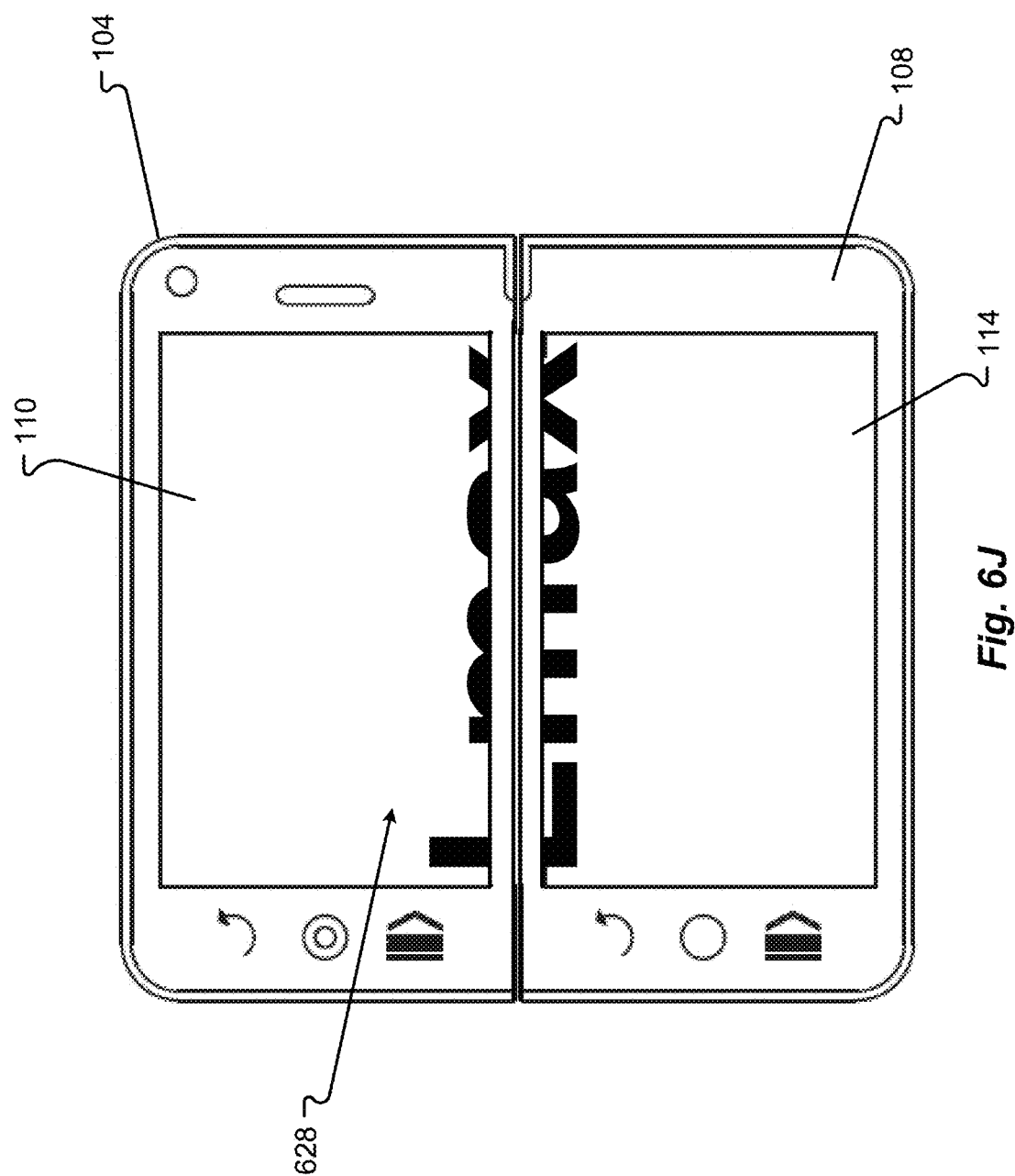
FIG. 6J is a tenth representation of an embodiment of a device configuration generated in response to the device state.

FIG. 6J depicts still another output configuration that may be accommodated while the device 100 is in an open landscape state 348. Specifically, the device 100 may be configured to present a single continuous image across both touch sensitive displays 110, 114 in a landscape configuration referred to herein as a Landscape-Max (LMax) configuration 628. In this configuration, data (e.g., a single image, application, window, icon, video, etc.) may be split and displayed partially on one of the touch sensitive displays while the other portion of the data is displayed on the other touch sensitive display. The Lmax configuration 628 may facilitate a larger display and/or better resolution for displaying a particular image on the device 100. Similar to other output configurations, it may be possible to transition the device 100 from the Lmax configuration 628 to any other output configuration described herein depending upon which state the device 100 is moved.

FIGS. 7A and 7B, in another aspect of the invention, each depict an example of gesture sequences that cause the device 100 to alter the display of data thereon. FIG. 7A depicts a first gesture sequence 700 including three device states or device positions in which the last state or position is a first output configuration display. Although the first output configuration display is depicted as being performed on the touch sensitive displays 110, 114, it should be appreciated that the first display can alternatively, or additionally, be performed on other parts of the primary screen 104 and/or secondary screen 108. The first gesture sequence 700 begins when the device 100 is in an open portrait state 320. While in this state, the device 100 displays data on both displays 110, 114. The device 100 may display application data on the displays 110, 114 from different sets of a single application, or data from different applications (e.g., first and second applications). In the depicted example, a first set of data from a first application or a first application may initially be displayed in a first portrait configuration 604 and a second set of data from the first application or data from a second different application may be initially displayed in a second portrait configuration 608. In other words, the first and second displays 110, 114 may depict first and second aspects of a first application or data from first and second different applications. The first gesture 700 shows the displays 110, 114 in a PD output configuration. Although the displays are described with respect display of applications, alternatively, one or both of the displays may display a desktop, control page, webpage, other types of visual displays, and combinations thereof.

As shown, a first user input 704 is received that causes the device 100 to rotate the in the direction of arrow 708 (e.g., clockwise) by 90 degrees, although such a rotation is not required. Alternatively, a counter-clockwise rotation by 90 degrees or any rotation by a predetermined amount greater than or less than 90 degrees may also qualify as the first user input 704. The rotation of the device 100 may be detected, in some embodiments, by registering a rotation event with the task management module 540 which subsequently informs the MDM module 524 of the rotation. The rotation event may be registered by receiving one or more inputs from the accelerometer 176. During the rotation, the displays 110, 114 may continue to display the same data as before the first input 704 was received.

A second user input 712 as shown causes the rotation of the device 100 to stop. Accordingly, the device 100 is shown as oriented in an open landscape state after the second user input 712 is received. At this point, the MDM module 524 may determine the relative position of the displays 110, 114 (e.g., determine which display or screen 104, 108 is above the other) and based on the relative position of the displays in the final orientation, the MDM module 524 may instruct the window management module 532 to cause data from the application in the upper display (display 110 in this example) to "drop" down onto the lower display. In the example depicted in FIG. 7A, the first set of data from the first application may be automatically maximized across both displays 110, 114. This automated maximization of displayed data from the upper display may be referred to as a "gravity" drop of the data displayed because the data is dropped or moved by the force of gravity as detected by the accelerometer 176.

If the data displayed in the upper display is a single-screen application, then the application may be automatically maximized into an Lmax output configuration. If the application is a multi-screen application, then the application can be automatically maximized into either an Lmax output configuration or an LD output configuration, depending upon the maximization rules for that application. Accordingly, the display of data for the first gesture sequence 700 may correspond to a display of application data simultaneously in first and second landscape configurations 612, 616 or as a single Lmax output configuration 628.

FIG. 7B depicts a second gesture sequence 714 including three device states or device positions in which the last position illustrated is a second output configuration display. Like the first gesture sequence 700, the second gesture sequence 714 can be performed on any component of the device 100. The second gesture sequence 714 begins when device 100 is in an open landscape state 348. While in this state, the device 100 displays data on both its displays 110, 114. The device 100 may display data from one or multiple applications on both the displays 110, 114 in either an LD output configuration or an Lmax output configuration. The manner in which the application is displayed on both displays 110, 114 depends upon the maximization rules for that application(s) as determined by the MDM module 524.

A first user input 716 corresponding to a rotation of the device 100 is shown. Again, the input registered at the MDM module 524 may correspond to a data input provided by the task management module 540 in response to the task management module 540 detecting the physical rotation of the device 100. As described with respect to FIG. 7A, and also applicable to FIG. 7B, the device 100 may be rotated in a direction of arrow 720 (e.g., counter-clockwise) by 90 degrees, although such a rotation is not required. Rather, a clockwise rotation by 90 degrees or any rotation by a predetermined amount greater or less than 90 degrees may also qualify as the first user input 716. During the rotation, the displays 110, 114 may continue to display the same data as before the first input 716 was received.

A second user input 724 causes rotation of the device 100 to stop. As shown, the device 100 is oriented in an open portrait state after the second user input 724 is received. At this point, the MDM module 524 and/or window management module 532 may determine which application was originally being displayed in the open landscape state and the window management module 532 may determine the maximization rules for that application. Specifically, if the application corresponds to a multi-screen application, the application may be kept in a maximized state, since it was originally in a maximized state. However, the application may be re-laid out based on its internal structure; in the case of a multi-screen application, standard maximization rules may be referenced which cause the application to be displayed in a PD output configuration. However, if the maximization rules dictate that Pmax output configuration 624 is required for the application belonging to the top screen, then the window management module 532 may cause the application to be displayed in a Pmax output configuration 624.

Figure 8:
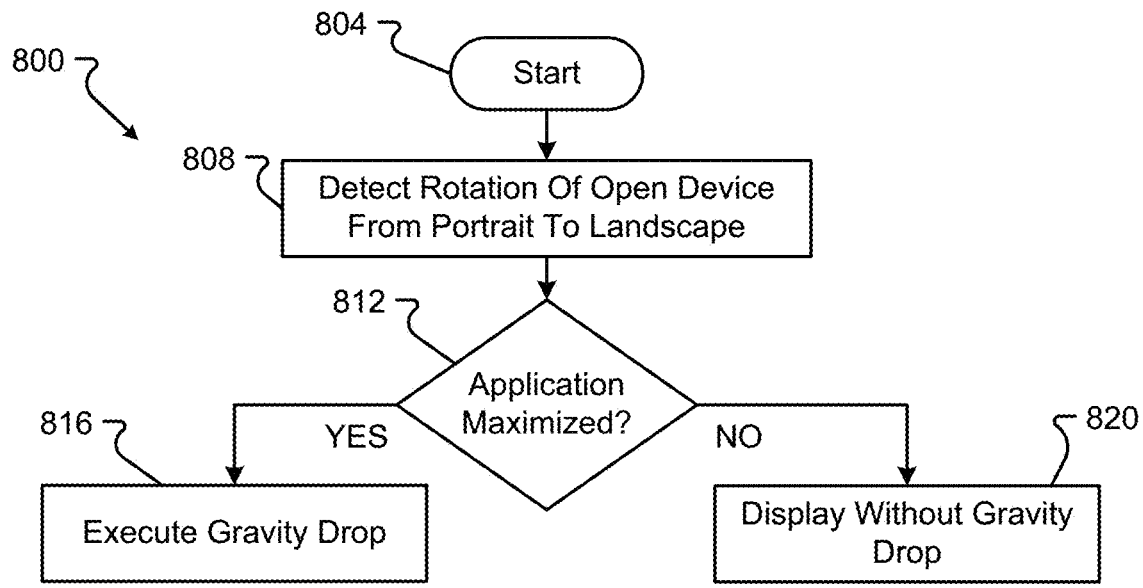
FIG. 8 is a flow diagram depicting a first display control method in accordance with embodiments of the present disclosure.

Referring now to FIG. 8, a first display control method 800 is shown. The method 800 is initiated at step 804. A device 100 is initially in an open portrait state 320. The method continues when the rotation of the device 100 is detected (step 808). Specifically, the transition of the device 100 from an open portrait state 320 to an open landscape state 348 may be detected in step 808.

The method continues with the MDM module 524 and/or window management module 532 determining whether the application that was being presented in the now upper display was in a maximized state (step 812). Specifically, the MDM module 524 and/or window management module 532 may determine the state of the application (e.g., whether maximized or minimized) when the device 100 was in the open portrait state 320 and based on that determination, decide how to automatically re-render the display of the application in the open landscape state 348.

If the application was maximized before the device 100 was rotated from an open portrait state 320 to an open landscape state 348, then the window management module 532 may execute a gravity drop on the application such that the application is automatically maximized across both displays 110, 114 in the landscape state 348 (step 816). In some embodiments, the application that is now on the upper screen/display may be automatically maximized across both displays 110, 114 in either an LD output configuration or an Lmax output configuration.

If the application was not maximized before the device 100 was rotated, then the window management module 532 may reference the minimization display rules for the application and may display the application on its original screen without performing a gravity drop (step 820). In particular, if a desktop or a different application was originally displayed on the now bottom display, then that same data or a variation thereof may be displayed on the bottom display. The application on the top display may still be displayed on the top display, but the data from that application may be reformatted for display in a landscape output configuration rather than a portrait output configuration.

Figure 9:
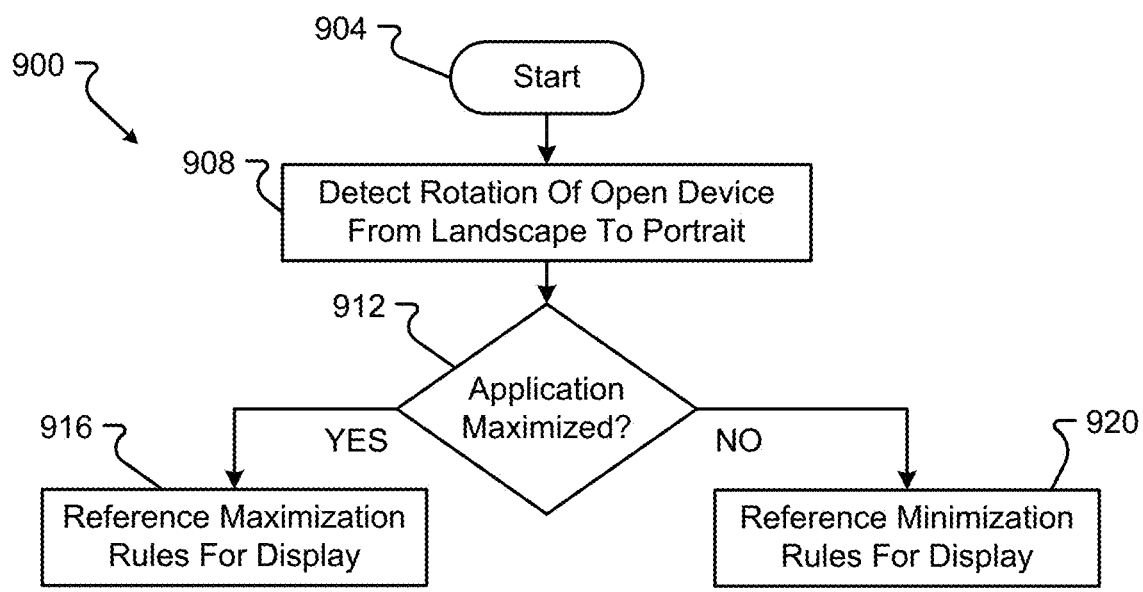
FIG. 9 is a flow diagram depicting a second display control method in accordance with embodiments of the present disclosure.

Referring now to FIG. 9, a second display control method 900 is shown. The method 900 is initiated at step 904. A device 100 is initially in an open landscape state 348. The method continues when the rotation of the device 100 is detected (step 908). Specifically, the transition of the device 100 from an open landscape state 348 to an open portrait state 320 is detected in step 908.

The method continues with the MDM module 524 and/or window management module 532 determining whether the application that was being presented in the upper display was in a maximized state (step 912). Specifically, the MDM module 524 and/or window management module 532 may determine whether a gravity drop was previously imposed on the display of a multi-screen application and, if so, the window management module 532 may cause the application to be re-formatted for display in a portrait output configuration (step 916). Specific portrait-maximization rules may be referenced by the window management module 532 for the application in question. The window management module 532 may also determine that some of the data from the application should be displayed on one of the displays 110 in a first portrait configuration 604, whereas other data from the same application should be displayed on the other display 114 in a second portrait configuration 608.

If the application was not maximized before the rotation of the device 100 to a portrait state, the window management module 532 may reference minimization rules to determine how the application should be displayed by the device 100 (step 920). In particular, the window management module 532 may determine whether the application should be displayed on one or two displays in the minimized state.

Figure 10:
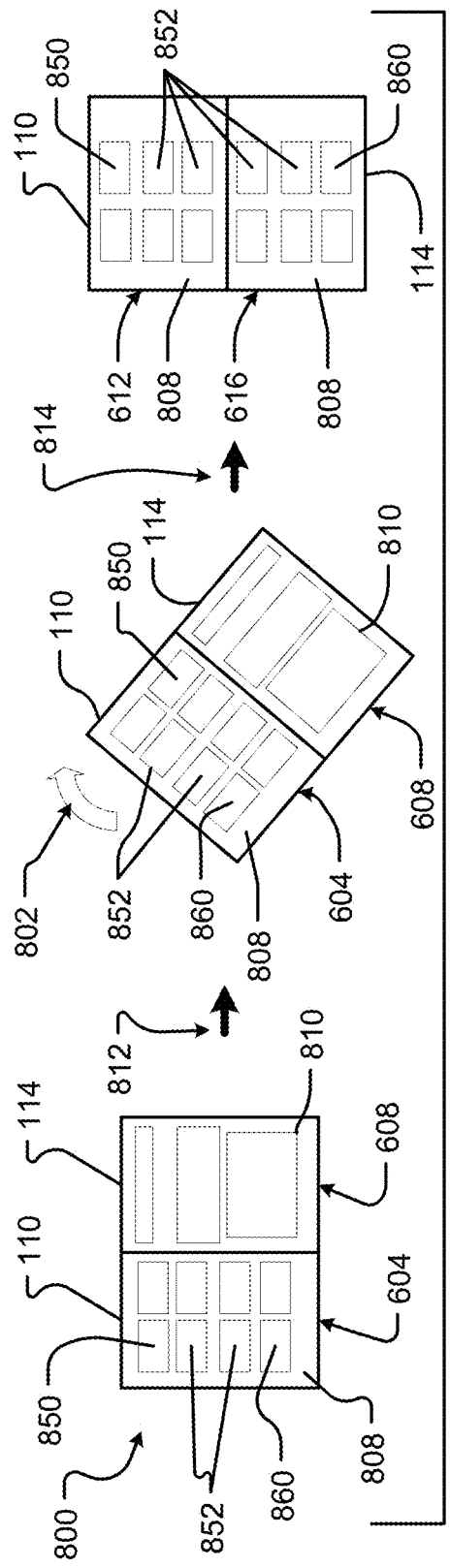
FIG. 10 is a visual representation of a change in a user interface after a change in the orientation of the mobile device.
Figure 11:
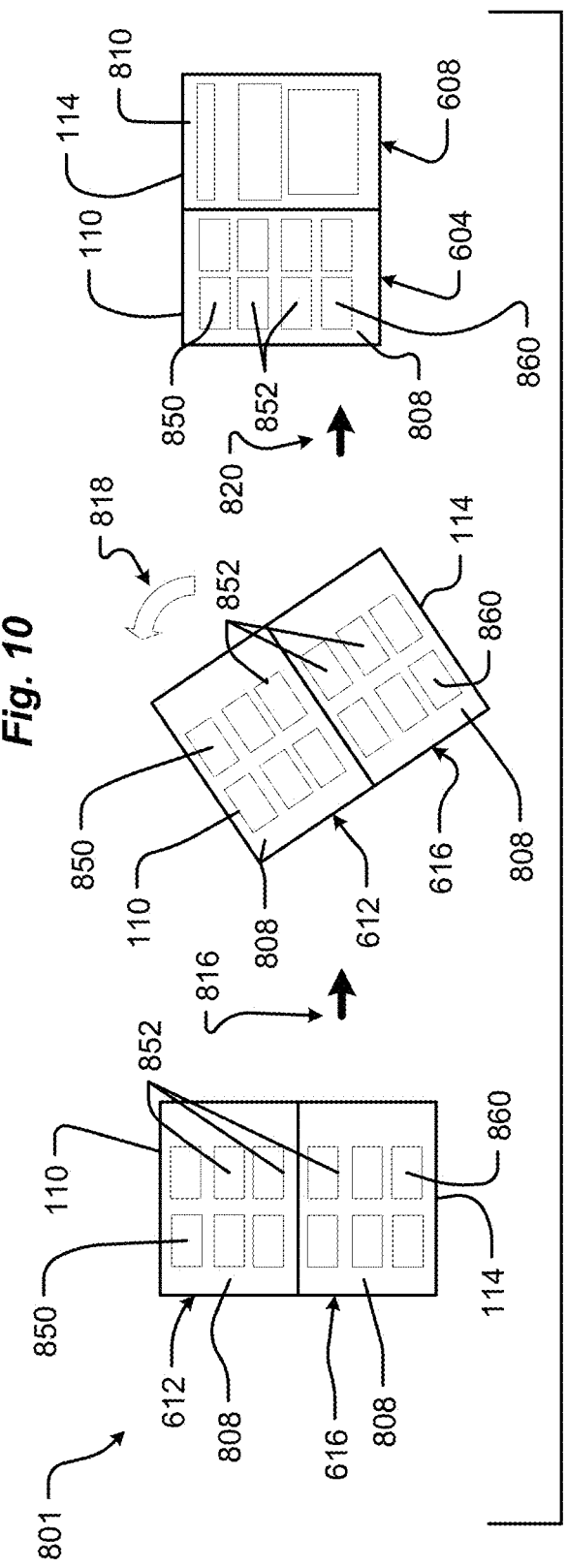
FIG. 11 is another visual representation of a change in a user interface after a change in the orientation of the mobile device.

Referring now to FIGS. 10 and 11, another aspect of the invention is depicted in further examples of gesture sequences that cause the device to alter the display of data thereon. Referring first to FIG. 10, a first gesture sequence 800 is illustrated, including three device states or positions, in which the last state or position can be defined as a first output configuration display. As shown, the first gesture sequence 800 begins when the device is in an open portrait state 320. The device 100 shows or displays data on both the primary and secondary displays 110 and 114. In the example of the first view of FIG. 10, the device is shown as displaying a control page 808 on the primary screen 110, and a webpage 810 on the secondary screen 114. However, as previously mentioned, the device could display data from different sets of a single application. As also shown, while in this state, the device displays the data in respective portrait configurations 604 and 608. More specifically, the first state shows the displays in a PD output figuration.

A first user input 812 is received that causes the device to rotate in the clockwise direction of the arrow 802. As shown in the third view of the FIG. 10, the device is ultimately rotated by approximately 90°. Alternatively, a counterclockwise rotation or any rotation by a predetermined amount may qualify as the first user input 812. As also mentioned, the detection of the rotational movement may be achieved by registering a rotation event with the task management module 540, which subsequently informs the MDM module 524 of the rotation. The rotation event may be registered by receiving one or more inputs from the accelerometer 176. During the rotation, the displays 110 and 114, continue to display the same data.

A second user input 814 indicates that the rotation of the device has stopped. Upon achieving this second input, the gravity drop feature is activated, and the device therefore shows data in the open landscape configuration. The MDM module 524 again may determine the relative position of the displays, and based upon this determination, the MDM module 524 may instruct the window management module 532 to cause data from the application in the upper display to also drop down onto the lower display. Therefore, in the example depicted, the data in the display 110 is maximized across both of the displays 110, 114. If the data displayed in the upper display is a single screen application, then the application may be automatically maximized into an Lmax output configuration. If the application is a multi-screen application, then the application can be automatically maximized into either an Lmax configuration or an LD configuration, depending upon the maximization rules for that application. In the example of FIG. 10, the user is provided a control screen extending across both displays, which enhances the user's ability to manipulate various controls for the application. Also shown in the FIG. 10, the control page 808 on display 110 illustrates a number of icons 850, which may correspond to various control features. For example, the icons 850 could represent a toolbar extending across the upper portion of the screen, and could represent functions such as bookmarks, most visited applications/websites, and history of websites viewed. The icons 860 could represent yet another toolbar, and provide further functions such as control buttons for the last page viewed, sorting most visited sites, and listings of recently viewed sites. In the middle portion of the control page 808, yet another set of icons 852 may represent different applications or functional modules within a single application. Noting the last position of FIG. 10, the toolbars 850 and 860 are maintained, yet an expanded list of the group of applications or functional modules 852 are illustrated, attributed to the expanded area for viewing when the device is rotated.

Referring to FIG. 11, another set of gesture sequences 801 are illustrated for three positions of the device in which the device is returned to its original position in FIG. 10 by a counterclockwise rotation of the device. A first user gesture 816 is executed in which the device is rotated counterclockwise as indicated by the rotational arrow 818. The gesture 820 indicates that the device has completed its rotation and is stopped. The device returns to its dual portrait configuration display in which the control page 808 is illustrated on the display 110, while the webpage 810 is illustrated on the display 114. Thus, the prior gravity drop feature is disabled by returning the device to its PD output configuration.

Figure 12:
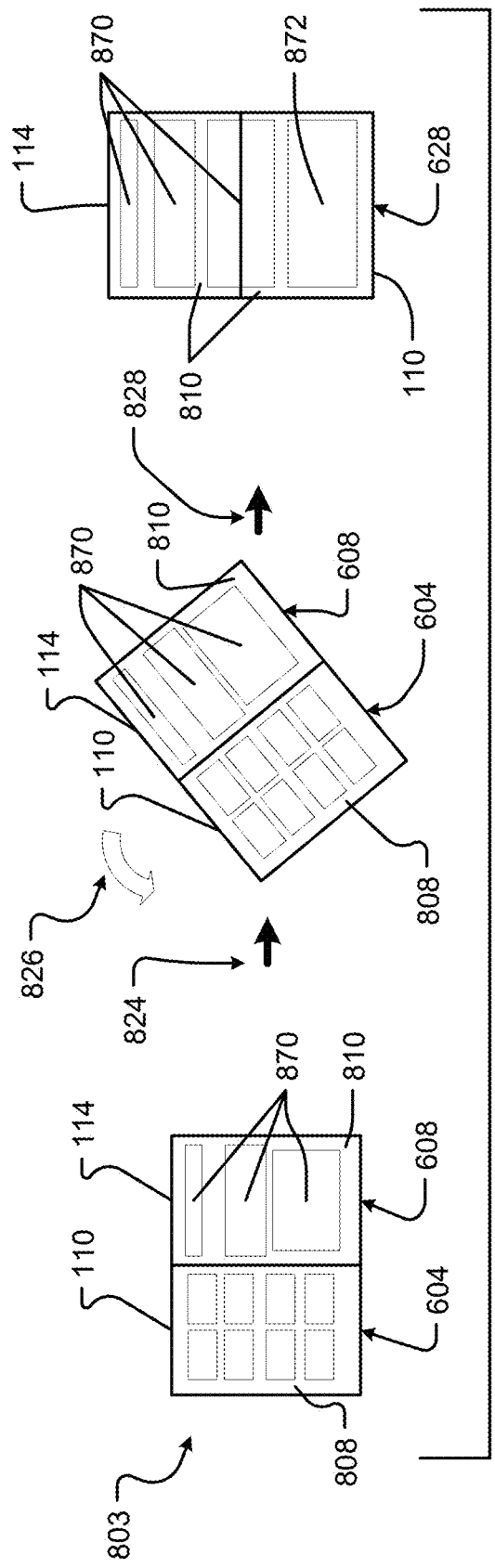
FIG. 12 is another visual representation of a change in a user interface after a change in the orientation of the mobile device.

Referring to FIG. 12, yet another set of gesture sequences 803 are illustrated for purposes of further explaining the gravity drop feature of the invention. In the example of FIG. 12, three device states are again shown in which the device is first configured in the dual portrait configuration including the first portrait configuration 604 and the second portrait configuration 608. Like FIGS. 10 and 11, FIGS. 12 and 13 illustrate three device states or positions, in which the last state or position can be defined as a first output configuration display. The control page 808 is again shown on the display 110, while the webpage is shown on the display 114. A first user gesture 824 is executed which results in a counterclockwise rotation of the device, as indicated by the rotational arrow 826. The device is rotated approximately 90°, and the user gesture 828 indicates the rotation has stopped. The gravity feature is accomplished in which now; the webpage 810 extends across both the displays 110 and 114. In this state, the figure is intended to represent that further information is now viewable for the webpage 810, since there is a greater area in which to display the data. Prior to rotation, the webpage illustrates three major data fields or images 870, yet when the devices rotated, because of the additional available on the screens, there are now four major data fields or images that can be displayed, the additional data field or image shown as field/image 872.

Figure 13:
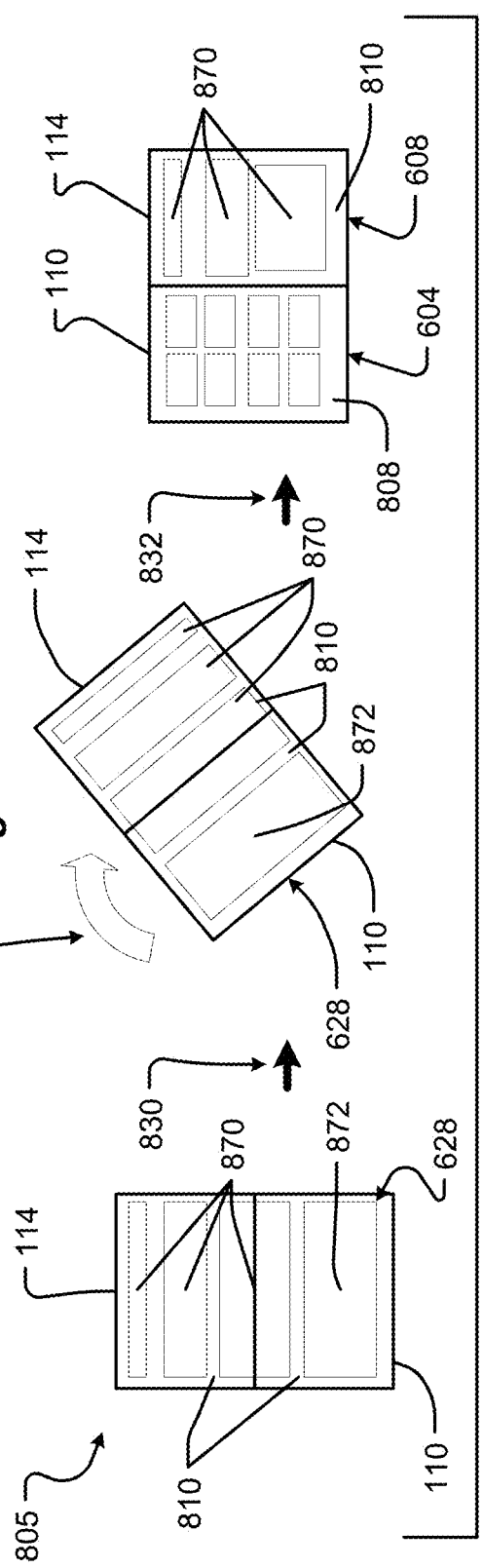
FIG. 13 is another visual representation of a change in a user interface after a change in the orientation of the mobile device.

Referring to FIG. 13, another set of gesture sequences 805 are illustrated in which the device is returned to its original position in FIG. 12 by a clockwise rotation of the device. Accordingly, a first gesture 830 is executed in which the device is rotated clockwise as indicated by the clockwise rotational arrow 802. The gesture 832 indicates that the device has completed its rotation. The device returns to its dual display in which the control page 808 is illustrated on the display 110, while the webpage 810 is illustrated on the display 114. The number of visible fields or images on the webpage thus returns to the three fields/images 870.

Figure 14:
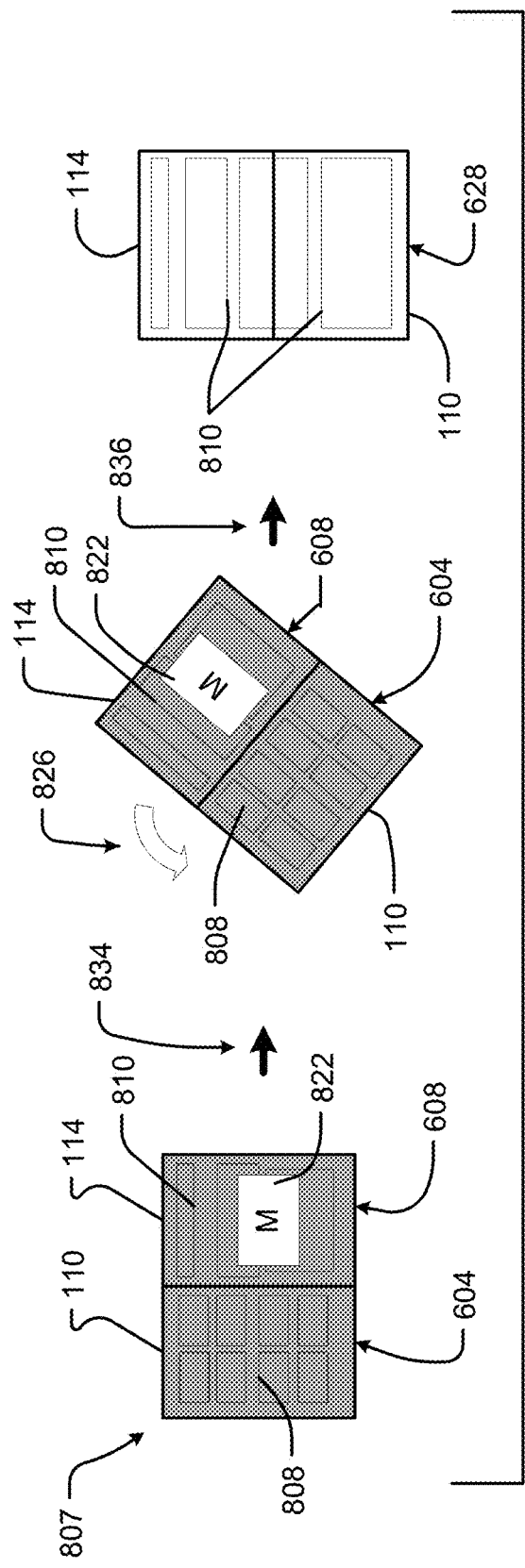
FIG. 14 is another visual representation of a change in a user interface after a change in the orientation of the mobile device.
Figure 15:
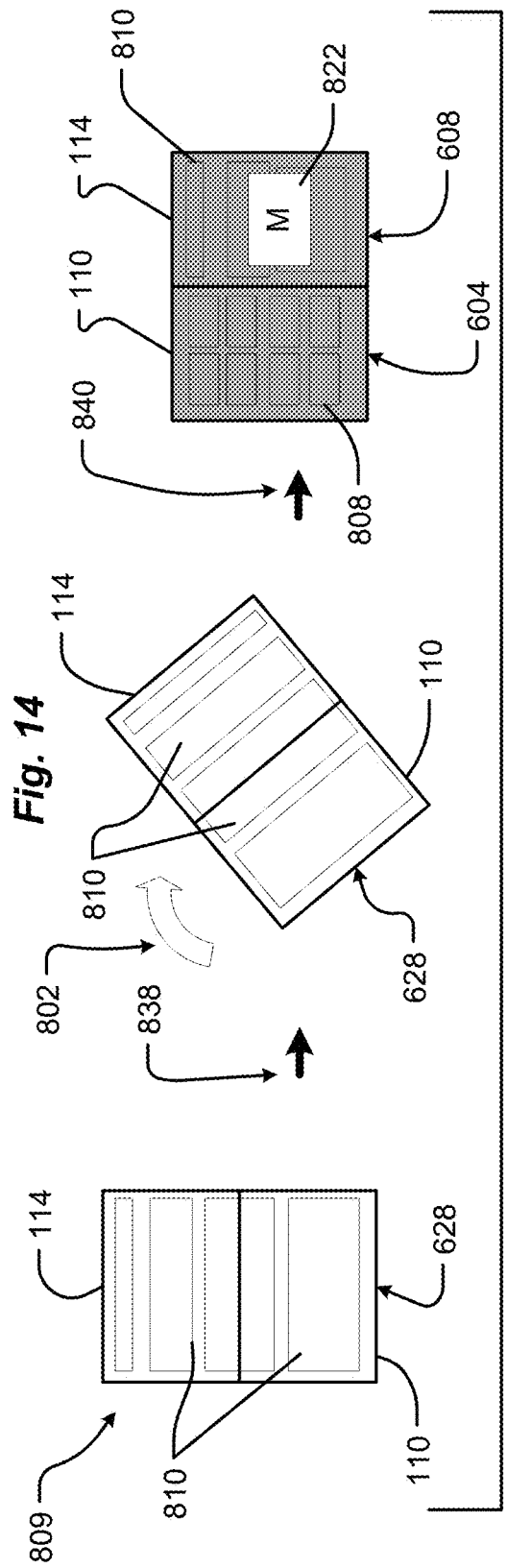
FIG. 15 is another visual representation of a change in a user interface after a change in the orientation of the mobile device.

Referring to FIGS. 14 and 15, yet another aspect of the invention is disclosed in further examples of gesture sequences that cause the device to alter the display of data. Referring first to FIG. 14, a gesture sequence 807 is illustrated, including three device states or positions, in which again the last state or position can be defined as a first output figuration display. As shown, the gesture sequence 807 begins when the device is in an open portrait state 320. The device 100 displays data both on the primary and secondary displays 110 and 114. In this example, the device again shows a control page 808 on the primary screen 110, and a webpage 810 on the secondary screen 114, and the device displays the data in respective portrait configurations 604 and 608. Alternatively as mentioned, the device could display data from different sets of a single application. In this example, an additional element is shown, namely, a modal window 822 on the secondary screen 114. As understood by those skilled in the art, a modal window can be generally characterized as a child window that may require the user to interact with the window before the user can further interact with the corresponding parent application. Thus, a modal window is one in which workflow may be prevented in the parent application until the user interacts with the modal window. Further, the modal window could be in the form of a dialog box. A dialog box can be generally defined as a type of window that enables the user to exchange a dialog with the device, and typically in which the dialog box provides one or more pre-selected options for the user to choose from. The dialog box may be furthered defined as "modal" or "modeless". A modal dialog box is one in which workflow in the parent application is prevented until the user interacts with the dialog box. A modeless dialog box is one in which the user can continue with operations within the parent application, and it is not a requirement to interact with the dialog box. In the example of FIG. 14, it shall therefore be understood that the modal window 822 could be either a modal dialog box or a modeless dialog box.

A first user input 834 is executed to rotate the device counterclockwise, as indicated by the directional arrow 826. A second user input 836 indicates that the rotation of the device has stopped. Upon achieving this second input, the gravity drop feature is activated in the device. Therefore, data is displayed in the open landscape state across both the displays 110 and 114 for the webpage 810. It is further shown that priority for display is in favor of the gravity drop feature, therefore, the modal window 822 is also dismissed when the device has been rotated. Accordingly, the specified portrait maximization rule referenced by the window management module 532 indicates that the webpage 810 takes priority over the modal window 822. The user is therefore able to interact with the webpage 810.

Now referring to FIG. 15, another gesture sequence 809 is illustrated. As shown, the device is first in the open landscape state with the webpage 810 maximized across both the primary and secondary screens. A user input gesture 838 is executed to rotate the device clockwise as referenced by the rotational arrow 802. A second user input 840 indicates that the rotation of the device has been completed at approximately the 90° rotation point. In this orientation, the device is returned to the original position of FIG. 14 in the open portrait state 320, and therefore the control page 808 is displayed on the primary screen 110, while the webpage 810 is displayed on the secondary display 114. The modal window 822 is again illustrated, enabling the user to still interact with the modal window 822, if desired. Also, the modal window 822 could be defined as a modeless dialog box, since the gravity drop feature of the invention takes precedence over the modal window.

In the example of FIGS. 14 and 15, the modal window 822 was illustrated on the screen that became the upper oriented screen after the device was rotated, yet the maximization rule for the application on that window was determined to take priority over the modal window 822. It however shall also be understood that the modal window 822 could be placed on the other screen, namely, the lower oriented screen, and according to this example, the modal window 822 would still be dismissed in favor of display of the upper oriented screen that is maximized due to the gravity drop feature.

Figure 16:
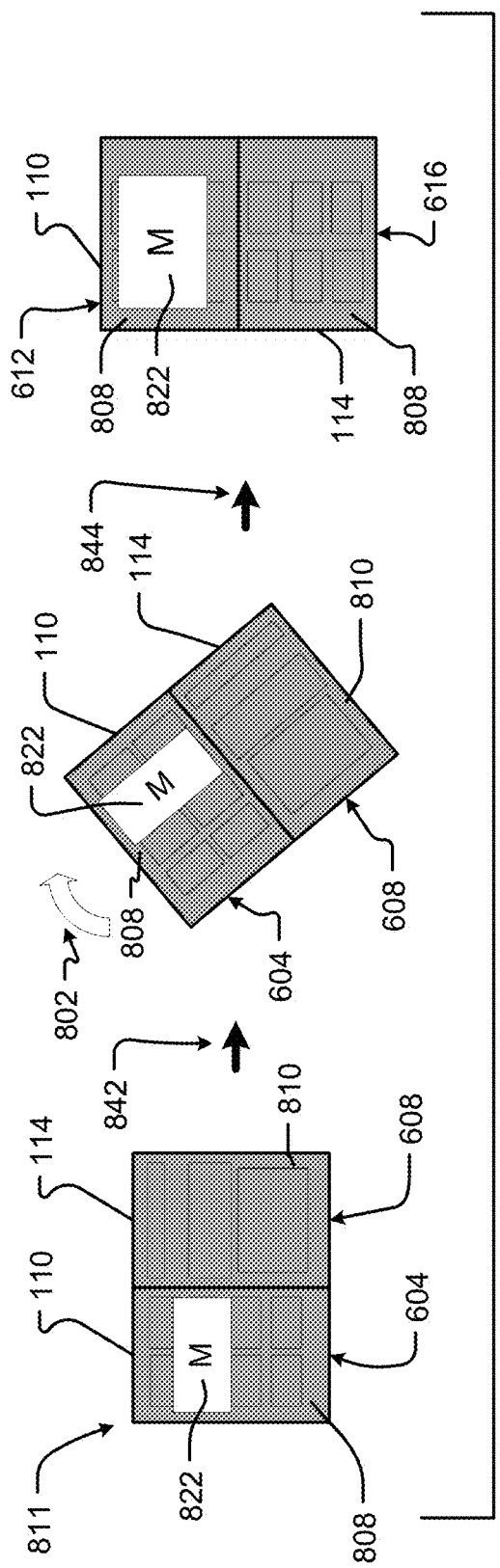
FIG. 16 is another visual representation of a change in a user interface after a change in the orientation of the mobile device.
Figure 17:
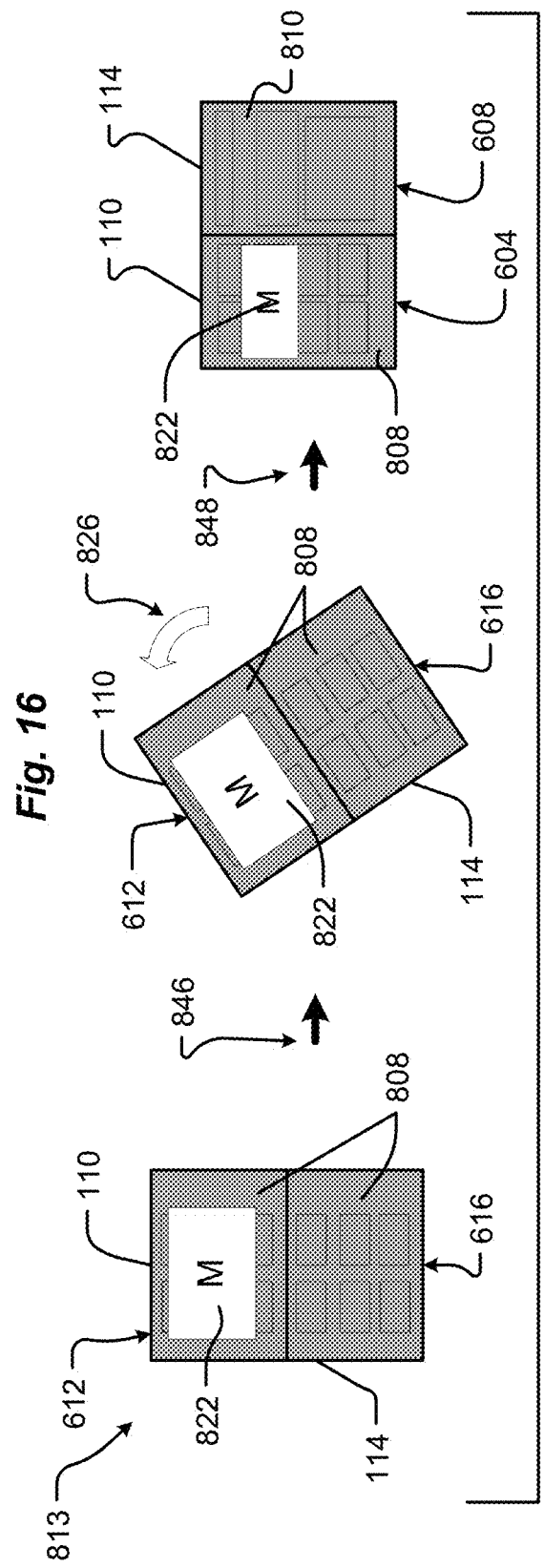
FIG. 17 is another visual representation of a change in a user interface after a change in the orientation of the mobile device.

Referring to FIGS. 16 and 17, yet another aspect of the invention is disclosed in further examples of gesture sequences that cause the device to alter the display of data. Referring first to FIG. 16, a gesture sequence 811 is illustrated, including three device states or positions, in which again, the last state or position can be defined as a first output figuration display. As shown, the gesture sequence 811 begins when the device is in an open portrait state 320. The device 100 displays data both on the primary and secondary displays 110 and 114. In this example, the device again shows a control page 808 on the primary screen 110, and a webpage 810 on the secondary screen 114. Therefore, the device displays the data in respective portrait configurations 604 and 608. As mentioned, the device could alternatively display data from different sets or modules of a single application. In this example, the modal window 822 is shown on the primary screen 110. It shall be understood that the modal window 822 could be either a modal dialog box or a modeless dialog box.

A first user input 842 is executed to rotate the device clockwise, as indicated by the directional arrow 802. A second user input 844 indicates that the rotation of the device has stopped at a point of approximately 90° rotation. Upon achieving this second input, the gravity drop feature is activated in the device and therefore, data is displayed in the open landscape state with the control page 808 maximized across both displays. Although the display takes advantage of the gravity drop feature in which the control page 808 is shown in the open landscape state, the modal window 822 is not dismissed when the device has been rotated. Accordingly, the specified portrait maximization rule referenced by the window management module 532 indicates that the control page will be maximized, but the modal window then takes priority over the open landscape state display of the control page 808 in terms of user interaction. The user is therefore unable to interact with the control page 808 until the user first interacts with the modal window 822.

Referring to FIG. 17, another gesture sequence 813 is illustrated. As shown, the device is first in the open landscape state with the control page 808 maximized across both the primary and secondary screens 110 and 114. The modal window 822 appears in the upper portion of the device on the primary screen 822. A user input gesture 846 is executed to rotate the device counterclockwise as referenced by the rotational arrow 826. A second user input 848 indicates that the rotation of the device has been completed at approximately the 90° rotation point. In this orientation, the device is returned to the open portrait state 320, and therefore the control page 808 is again displayed on the primary screen 110, while the webpage 810 is displayed on the secondary display 114. The modal window 822 remains displayed, enabling the user to still interact with the modal window 822, if desired.

The gesture sequences 811 and 813 of FIGS. 16 and 17 are intended to illustrate that the gravity drop feature of the invention can be achieved, but instead of a dismissal of the modal window 822 as shown in embodiment of FIGS. 14 and 15, the modal window 822 remains as the priority application or function in another embodiment of the invention. Accordingly, if the user desires to interact with an application on either the primary or secondary screens, the user must first interact with the modal window 822. Therefore, for the embodiment of FIGS. 16 and 17, the modal window could be defined as a modal dialog box.

The exemplary systems and methods of this disclosure have been described in relation to display control mechanisms. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a computer, laptop, netbook, smart phone, mobile device, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of controlling data displayed by a multi-display device, comprising:

providing a first window for a first display of the multi-display device and a second window for a second display of the multi-display device, the first and second windows being associated with a first application and a second application, respectively;

displaying a modal window, associated with the second window in the second display, wherein the modal window is a child window displayed above the second window and allows input to be received into the second application without an interaction with the second window, wherein workflow in the second application is prevented until the modal window is addressed;

detecting the modal window being associated with the second window;

detecting the device in a first orientation, wherein the first display is located horizontally adjacent to the second display;

rotating the device from the first orientation to a second orientation, wherein, in the second orientation, the first display is placed above the second display;

detecting the device in the second orientation;

in response to detecting that the device is in the second orientation, executing a gravity drop function, wherein the first window appears to drop down from the first display onto the second display to occupy both the first and second displays, and wherein the first window is maximized across both displays;

in response to the gravity drop function, applying a specified maximization rule that specifies priority between the first window and the second window;

in response to determining that the first window takes priority over the second window based on applying the specified maximization rule, dismissing the second window and, based on the modal window being associated with the second window, dismissing the modal window; and in response to determining that the second window takes priority over the first window based on applying the specified maximization rule, dismissing the second window but maintaining the modal window and preventing user interaction with the first window until a user interacts with the modal window.

2. A method, as claimed in claim 1, wherein:
the second orientation corresponds to an open landscape state.

3. A method, as claimed in claim 1, wherein:
rotation of the device is detected, at least in part, by an accelerometer of the device.

4. A method, as claimed in claim 1, wherein:
when the gravity drop function is executed, the first window is enlarged across both displays.

5. A method, as claimed in claim 1, wherein:
when the gravity drop function is executed, elements of the first window not shown when the first display was located horizontally adjacent to the second display, are shown when the first window also occupies the second window.

6. A method, as claimed in claim 1, wherein:
the rotating step is executed through a predetermined angle.

7. A method, as claimed in claim 1, wherein:
the rotating step is executed through an angle of approximately 90°.

8. A method, as claimed in claim 1, further including:
wherein rotating the device from the second orientation to the first orientation includes rotating the device in a reverse angle approximately the same magnitude as the first rotating step.

9. A method, as claimed in claim 1, wherein:
the first window includes at least one of a user application, a control page, or a webpage.

10. A method, as claimed in claim 1, wherein:
the second window includes at least one of a user application, a control page, or a webpage.

11. A method, as claimed in claim 1, wherein:
said modal window is a modal dialog box.

12. A method, as claimed in claim 1, wherein:
in response to determining that the device is in the first orientation, re-displaying the modal window on the second display.

13. A method as claimed in claim 1, wherein:
in response to determining that the device is in the first orientation, maintaining the display of the modal window.

14. A method as claimed in claim 1, wherein:
in response to determining that the device is in the first orientation, moving the display of the modal window back to the second display.

15. A non-transitory computer readable medium comprising microprocessor executable instructions operable to perform at least the following steps for a multi display device having a first window for a first display and a second window for a second display, the first and second windows being separate applications, the instructions comprising:
instructions to provide a first window for the first display and a second window for the second display, the first and second windows being associated with a first application and a second application, respectively;
instructions to display a modal window, associated with the second window in the second display, wherein the modal window is a child window displayed above the second window and allows input to be received into the second application without an interaction with the second window, wherein workflow in the second application is prevented until the modal window is addressed;
instructions to detect the modal window being associated with the second window;
instructions to detect the device in a first orientation, wherein the first display is located horizontally adjacent to the second display;
instructions to receive an indication that the device is being rotated from the first orientation to a second orientation, wherein, in the second orientation, the first display is placed above the second display;
instructions to detect that the device in the second orientation;
in response to detecting that the device is in the second orientation, instructions to execute a gravity drop function, wherein the first window appears to drop down from the first display onto the second display to occupy both the first and second displays, and wherein the first window is maximized across both displays;
in response to the gravity drop function, instructions to apply a specified maximization rule that specifies priority between the first window and the second window;
in response to determining that the first window takes priority over the second window based on applying the specified maximization rule, instructions to dismiss the second window and, based on the modal window being associated with the second window, dismiss the modal window; and
in response to determining that the second window takes priority over the first window based on applying the specified maximization rule, instructions to dismiss the second window but maintain the modal window and prevent user interaction with the first window until a user interacts with the modal window.

16. A non-transitory computer readable medium, as claimed in claim 15, wherein:
in response to determine that the device is in the first orientation, instructions to redisplay the modal window on the second display.

17. A non-transitory computer readable medium, as claimed in claim 15, wherein:
in response to determine that the device is in the first orientation, instructions to maintain the display of the modal window.

18. A non-transitory computer readable medium, as claimed in claim 15, wherein:
in response to determining that the device is in the first orientation, instructions to move the display of the modal window back to the second.

19. A system, comprising:
a processor; and
a memory coupled to the processor and comprising computer readable program code that when executed by the processor causes the processor to perform operations comprising:
providing a first window for a first display of the multi-display device and a second window for a second display of the multi-display device, the first and second windows being associated with a first application and a second application, respectively;
displaying a modal window, associated with the second window in the second display, wherein the modal window is a child window displayed above the second window and allows input to be received into the second application without an interaction with the second window, wherein workflow in the second application is prevented until the modal window is addressed;
detecting the modal window being associated with the second window;

detecting the device in a first orientation, wherein the first display is located horizontally adjacent to the second display;
rotating the device from the first orientation to a second orientation, wherein, in the second orientation, the first display is placed above the second display;
detecting the device in the second orientation;
in response to detecting that the device is in the second orientation, executing a gravity drop function, wherein the first window appears to drop down from the first display onto the second display to occupy both the first and second displays, and wherein the first window is maximized across both displays;
in response to the gravity drop function, applying a specified maximization rule that specifies priority between the first window and the second window;
in response to determining that the first window takes priority over the second window based on applying the specified maximization rule, dismissing the second window and, based on the modal window being associated with the second window, dismissing the modal window; and
in response to determining that the second window takes priority over the first window based on applying the specified maximization rule, dismissing the second window but maintaining the modal window and preventing user interaction with the first window until a user interacts with the modal window.

* * * * *